US010788246B2

(12) United States Patent
Frank et al.

(10) Patent No.: US 10,788,246 B2
(45) Date of Patent: Sep. 29, 2020

(54) FROZEN BEVERAGE MACHINE CONTROL SYSTEM AND METHOD

(71) Applicant: FBD Partnership, LP, San Antonio, TX (US)

(72) Inventors: Jimmy I. Frank, San Antonio, TX (US); Daniel J. Seiler, Schertz, TX (US); Darren Simmons, Fair Oaks Ranch, TX (US); Jun Yang, San Antonio, TX (US)

(73) Assignee: FBD PARTNERSHIP, LP, San Antonio, TX (US)

( * ) Notice: Subject to any disclaimer, the term of this patent is extended or adjusted under 35 U.S.C. 154(b) by 1079 days.

(21) Appl. No.: 15/049,547

(22) Filed: Feb. 22, 2016

(65) Prior Publication Data

US 2016/0245573 A1 Aug. 25, 2016

Related U.S. Application Data

(60) Provisional application No. 62/120,602, filed on Feb. 25, 2015.

(51) Int. Cl.
*F25C 5/10* (2006.01)
*A23G 9/04* (2006.01)
*F25B 47/02* (2006.01)
*B67D 1/00* (2006.01)
*A23G 9/22* (2006.01)
*F25D 21/00* (2006.01)
*F25B 5/02* (2006.01)
*F25B 49/02* (2006.01)
*F25B 40/00* (2006.01)

(52) U.S. Cl.
CPC ............ *F25B 47/022* (2013.01); *A23G 9/045* (2013.01); *A23G 9/228* (2013.01); *F25B 5/02* (2013.01); *F25B 49/02* (2013.01); *F25D 21/006* (2013.01); *F25B 40/00* (2013.01); *F25B 2700/1931* (2013.01); *F25B 2700/1933* (2013.01); *F25B 2700/2106* (2013.01); *F25B 2700/21151* (2013.01)

(58) Field of Classification Search
CPC ..... A23G 9/045; F25C 5/10; F25C 2301/002; F25C 2500/08; F25B 47/022; F25B 47/025; F25B 49/02; B67D 1/0047; F25D 21/006
See application file for complete search history.

(56) References Cited

U.S. PATENT DOCUMENTS

| | | | |
|---|---|---|---|
| 2,276,811 A | 3/1942 | Ward | |
| 2,562,638 A | 7/1951 | Philipp | |
| 2,610,478 A | 9/1952 | Lofstedt | |
| 3,468,137 A * | 9/1969 | Welty ................... | B67D 1/0047 62/69 |
| 3,677,272 A | 7/1972 | Shrank | |
| 3,823,571 A | 7/1974 | Smith et al. | |
| 4,201,558 A * | 5/1980 | Schwitters ............. | A23G 9/045 137/594 |
| 4,213,795 A | 7/1980 | Ernstsson | |
| 4,590,970 A | 5/1986 | Mott | |

(Continued)

*Primary Examiner* — Frantz F Jules
*Assistant Examiner* — Erik Mendoza-Wilkenfel
(74) *Attorney, Agent, or Firm* — McAughan Deaver PLLC

(57) ABSTRACT

The inventions disclosed and taught herein relate generally to frozen beverage machines; and more specifically relate to improved methods of and apparatuses for controlling the consistency and quality of the dispensed beverage product.

14 Claims, 15 Drawing Sheets

(56) References Cited

U.S. PATENT DOCUMENTS

| | | | |
|---|---|---|---|
| 4,719,056 A * | 1/1988 | Scott | B01F 3/04815 |
| | | | 261/80 |
| 4,736,600 A | 4/1988 | Brown | |
| 4,745,853 A * | 5/1988 | Hoover | A23L 2/54 |
| | | | 261/27 |
| 4,784,697 A | 11/1988 | Bordini | |
| 5,270,013 A | 12/1993 | Decker | |
| 3,280,459 A | 10/1996 | Walker | |
| 5,632,411 A | 5/1997 | Harty | |
| 5,706,661 A * | 1/1998 | Frank | A23G 9/045 |
| | | | 426/67 |
| 5,740,844 A | 4/1998 | Miller | |
| 5,743,097 A | 4/1998 | Frank | |
| 5,799,726 A | 9/1998 | Frank | |
| 5,806,550 A | 9/1998 | Frank | |
| 5,899,077 A | 5/1999 | Wright | |
| 5,974,824 A | 11/1999 | Galockin | |
| 6,161,558 A | 12/2000 | Franks | |
| 6,189,745 B1 | 2/2001 | Frank | |
| 6,296,153 B1 * | 10/2001 | Bilskie | B67D 1/103 |
| | | | 222/129.2 |
| 6,513,578 B2 | 2/2003 | Frank | |
| 6,536,224 B2 | 3/2003 | Frank et al. | |
| 6,625,993 B2 | 9/2003 | Frank et al. | |
| 6,679,314 B2 | 1/2004 | Frank | |
| 7,562,793 B2 | 7/2009 | Ufheil | |
| 8,079,230 B2 | 12/2011 | Frank | |
| 8,701,435 B2 | 4/2014 | Gist et al. | |
| 9,107,449 B2 * | 8/2015 | Njaastad | A23L 2/54 |
| 9,173,521 B2 | 11/2015 | Gates | |
| 9,457,386 B2 | 10/2016 | Gates | |
| 10,034,488 B2 | 7/2018 | Graczyk | |
| 10,321,699 B2 | 6/2019 | Gates | |
| 10,327,455 B2 | 6/2019 | Gates | |
| 2001/0035016 A1 | 11/2001 | Weber et al. | |
| 2002/0043071 A1 | 4/2002 | Frank | |
| 2002/0083730 A1 * | 7/2002 | Giroux | B67D 1/02 |
| | | | 62/354 |
| 2004/0124548 A1 * | 7/2004 | Rona | B01F 15/00253 |
| | | | 261/64.3 |
| 2006/0186137 A1 | 8/2006 | Till | |
| 2007/0017234 A1 | 1/2007 | Moulder | |
| 2007/0062212 A1 | 3/2007 | Frank | |
| 2008/0203113 A1 | 8/2008 | Groh | |
| 2008/0254180 A1 | 10/2008 | Windhab | |
| 2008/0289357 A1 | 11/2008 | Skobel | |
| 2008/0302824 A1 | 12/2008 | Blomme | |
| 2010/0044395 A1 | 2/2010 | Webb | |
| 2010/0293965 A1 | 11/2010 | Frank | |
| 2011/0042414 A1 | 2/2011 | Tachibana | |
| 2011/0049190 A1 | 2/2011 | Sevcik | |
| 2011/0192423 A1 | 8/2011 | Boussemart | |
| 2013/0180594 A1 * | 7/2013 | Schneider | B67D 1/0057 |
| | | | 137/2 |
| 2014/0209635 A1 | 7/2014 | Gates | |
| 2016/0229675 A1 | 8/2016 | Popov | |
| 2016/0245564 A1 | 8/2016 | Frank | |
| 2016/0245573 A1 | 8/2016 | Frank | |
| 2017/0027185 A1 | 2/2017 | Acosta | |
| 2017/0027188 A1 | 2/2017 | Raybin | |
| 2017/0030467 A1 | 2/2017 | Versteeg | |
| 2018/0103656 A1 | 4/2018 | Acosta | |
| 2018/0106515 A1 | 4/2018 | Cobabe | |

\* cited by examiner

FROZEN BEVERAGE MACHINE CONTROL SYSTEM AND METHOD

CROSS REFERENCE TO RELATED APPLICATIONS

The present application claims the benefit of and priority to U.S. Provisional Patent Application Ser. No. 62/120,602, filed Feb. 25, 2015, and the contents of which are hereby incorporated by reference in its entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to frozen beverage machines; and more specifically relate to improved methods of and apparatuses for controlling the consistency and quality of the dispensed beverage product.

Description of the Related Art

Frozen beverage machines are known in the art and have been used for years. These devices produce, for example, a frozen carbonated beverage by freezing a mixture of ingredients typically including syrup, water and carbon dioxide in a freezing chamber. The mixture freezes on the inner surface of the chamber, which is surrounded by a helical coil through which a refrigerant passes. A rotating shaft is disposed inside the chamber that has a plurality of outwardly projecting blades that scrape the mixture off the inside wall of the freezing chamber. Once the carbonated beverage is in the desired frozen state, the product is dispensed from the chamber through a product valve.

The temperature and viscosity of the ingredients within the mixing chamber are maintained by a control system that controls the refrigeration system. The control system also controls the amount of the ingredients injected into the mixing chamber to maintain the quantity of such ingredients within the chamber at a prescribed amount. Such control systems typically include a pressure responsive device that controls the amount of ingredients fed into the chamber in response to chamber pressure.

Typically, the pressure of the carbon dioxide within the chamber is maintained above atmospheric pressure, and the temperature of the liquid within the chamber is maintained below the freezing point of water at atmospheric pressure, but above the temperature where the liquid readily freezes at the pressure within the chamber. The viscosity of the liquid typically must also be maintained within prescribed limits. Under these conditions of temperature and pressure and with the viscosity suitably maintained, the beverage is dispensed from the chamber through the product valve to atmospheric pressure, in a semi-frozen state similar to frozen foam.

The quality of the product is also determined by the ratio of the mixture of the syrup, water, and carbon dioxide content. The ability to control and adjust this mixture is a function of the ability to accurately monitor and control liquid levels, pressures, temperatures, and carbon dioxide content. While other factors such as syrup content also affect the quality of the product, the amount of carbonation is a strong contributing factor. A major drawback of known frozen carbonated beverage machines is their inability to maintain proper control over the liquid levels, pressures, temperatures, and the carbon dioxide content entering the mixing chamber, to produce a consistently high quality product.

The common current method for controlling a frozen beverage machines barrels refreeze cycle is based on the beater motor's torque (or power consumption). When the measured torque on the motor drops below a specified threshold, the machine initiates a freeze cycle and freezes the barrel until the torque on the motor reaches a higher specified torque. One observed issue with using the motor's torque is that the machine may, over time, begin to freeze more often. The time between freeze cycles becomes shorter, and the product in the barrel can become too cold. If the barrel is not defrosted often, the product in the barrel may not dispense out of the valve. Another issue is that small dispensed drinks may trigger a refreeze when the barrel should not be required to refreeze. All observed issues with the current control method reinforce the idea that the torque of the motor may not be the best indicator for triggering a refreeze.

The common current method for controlling frozen beverage dispensing utilizes the freezing chamber, which is an evaporator in a refrigeration system to make frozen beverage product. The physical behavior and the state of beverage product are constantly changing within the freezing chamber. The expansion and contraction of beverage product may be unpredictable.

Other problems with existing frozen beverage machines: (i) inconsistent ice crystal size and (ii) inconsistent barrel pressure which may cause: (a) excessively high barrel pressure leading to undesirably high dispense rates, (b) fluctuating barrel pressure leading to inconsistent ice crystal formation, (c) inconsistent drink quality, (d) "wet drinks" where expansion is too low and/or liquid/solid separation occurs, (e) cold drinks where the drinks are too stiff due to over freezing, (f) inconsistent "brightness" due to excessive pressure and gas within the barrel.

The inventions and subject matter disclosed and taught herein are directed to that overcomes, or at least minimizes, some of these problems.

BRIEF SUMMARY OF THE INVENTION

As one of many possible brief summaries of the nature and substance of the inventions claimed herein a frozen beverage machine may comprise at least one freezing chamber; a refrigeration system coupled to the freezing chamber; and at least one dynamic charge control system coupled to the freezing chamber, wherein the dynamic charge control system comprises: at least one expansion tank is coupled to the at least one freezing chamber; a charge pressure sensor coupled to the at least one expansion tank; a solution pressure sensor coupled to the at least one expansion tank; a supply solenoid coupled to at least one the expansion tank; a exhaust solenoid coupled to the at least one expansion tank; a controller configured for controlling the dynamic charge control system. The at least one expansion tank may be configured to contain a gas and a solution. The charge pressure sensor may be to determine an active pressure of the at least one expansion tank. The solution pressure sensor may be to determine a solution pressure of the at least one expansion tank. The supply solenoid may be to supply gas to the at least one expansion tank. The exhaust solenoid may be to exhaust gas from the at least one expansion tank. The supply solenoid and the exhaust solenoid may be to the expansion tank via a manifold. The dynamic charge control system may comprise a single integrated unit. The solution may be a beverage solution. The gas may comprise carbon dioxide. The refrigeration system may comprise a compressor; a condenser coupled to the compressor; and an expansion device coupled to the condenser.

As another of the many possible brief summaries of the nature and substance of the inventions claimed herein a method of controlling the active discharge pressure of frozen beverage machine, wherein the frozen beverage machines comprises a freezing chamber, an active charge control system and a refrigeration system, comprising: measuring an active discharge pressure of an expansion tank of an active charge control system; if the active discharge pressure is greater than a desired value, exhausting a medium from the expansion tank; and if the active discharge pressure is less than a desired value, supplying the medium to the expansion tank. The measuring an active discharge pressure may comprise reading the pressure from a pressure sensing device of the active charge control system. The supplying medium to the expansion tank may comprise turning on a supply solenoid of the active charge control system. The exhausting medium from the expansion tank may comprise turning on an exhaust solenoid of the active charge control system. The desired value may include a fixed range. The desired value may include a dynamic range. The desired value may be determined based on the desired drink profile. The method may further comprise determining a desired value based on the desired drink profile to be dispensed from the frozen beverage machine, a product type contained with the expansion tank, a configuration of the frozen beverage machine hardware or a desired pressure setpoint of the expansion tank. The dynamic charge control system may comprises a controller configured to control the dynamic charge control system.

As another of the many possible brief summaries of the nature and substance of the inventions claimed herein a method of controlling the active discharge pressure of frozen beverage machine, wherein the frozen beverage machines comprises a freezing chamber, an active charge control system and a refrigeration system, comprising: measuring an active discharge pressure of an expansion tank of an active charge control system; exhausting a medium from the expansion tank, if the active charge pressure is greater than a vent set point; and supplying the medium to the expansion tank, if the active charge pressure is less than a fill set point. The exhausting a medium from the expansion tank may occurs if currently the active charge control system is not exhausting a medium from the expansion tank or supplying the medium to the expansion tank. The supplying the medium to the expansion tank occurs may if currently the active charge control system is not exhausting a medium from the expansion tank or supplying the medium to the expansion tank. The dynamic charge control system may comprises a controller configured to control the dynamic charge control system.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
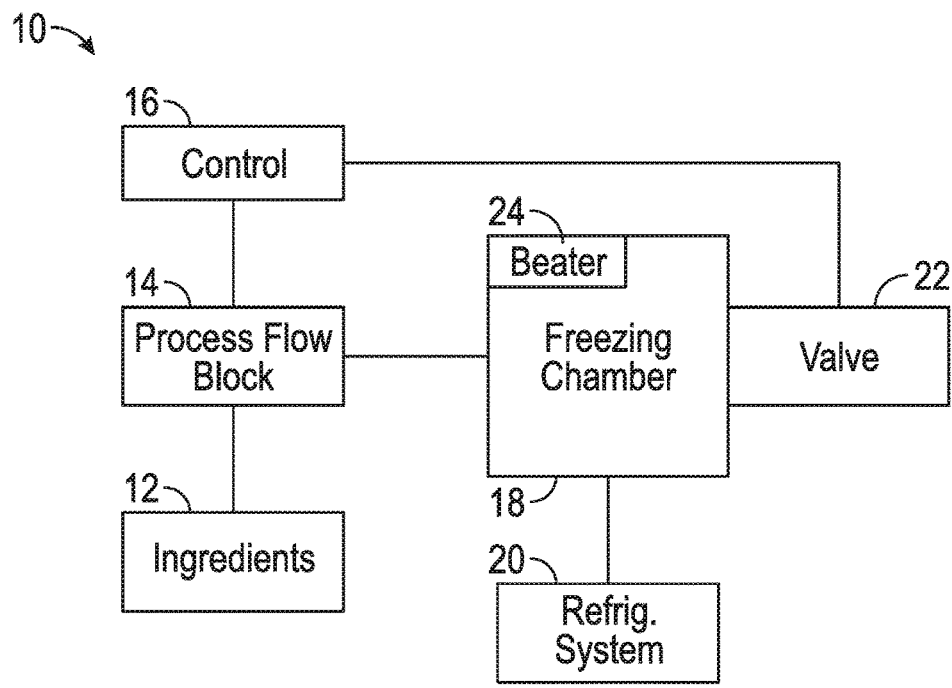
FIG. 1 is a block diagram conceptually illustrating portions of a frozen beverage machine in accordance with certain teachings of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Applicants have created methods of and apparatuses for measuring and controlling the liquid in a frozen beverage machine to control the consistency and quality of the dispensed beverage product.

FIG. 1 is a simplified block diagram schematically illustrating components of a frozen beverage machine 10 in accordance with certain teachings of or could be used in conjunction with the present disclosure. In FIG. 1, the frozen beverage machine 10 is a frozen beverage machine. The frozen beverage machine 10 includes an ingredients supply source 12, a process flow block 14, a controller 16, and a product chamber or barrel 18. In the exemplary frozen beverage machine 10, the ingredient supply source 12 may include, for example, a water supply, syrup supply and a gas supply. In the illustrated embodiment, the barrel 18 comprises a freezing chamber having a refrigeration system 20 associated therewith. The barrel 18 further comprises a beater 24. The product chamber or barrel 18 may be an evaporator in the refrigeration system 20. The frozen beverage machine 10 may alternatively have one or more barrels. Further descriptions of frozen beverage machines are provided in U.S. Pat. Nos. 5,706,661; 5,743,097; 5,799,726; 5,806,550; 6,536,224 and 6,625,993 by J. I. Frank, et al. The entire disclosures of these patents are incorporated by reference. Other known frozen beverage machine may be used in conjunction with methods and apparatuses disclosed in the present disclosure.

The barrel 18 is where product or liquid is frozen and maintained before dispensing. Initial pull down (IPD) is a process of freezing a liquid in the barrel 18 from a liquid state to a frozen ready to serve state. This occurs when barrel is already liquid and needs to be frozen. The thaw period or thaw cycle occurs when one of the barrels 18 of the frozen beverage machine 10 is turned on, but the refrigeration system 20 is off. The product or liquid in the barrel 10 is frozen and ready to serve, but is naturally thawing and not being frozen by refrigeration system 20. The freeze cycle or refreeze cycle occurs when one of the barrels 18 of the frozen beverage machine 10 is turned on and the refrigeration system 20 is on. The product in the barrel is already frozen but out of an acceptable range. Thus, freezing/cooling the product is required in order to maintain drink quality. A freeze cycle occurs between thaw cycles. Beater percentages (%) is a software variable displayed, which may be displayed on the user interface of frozen beverage machine 10, that indicates the torque load on the motor causing the beater 24 to move. Beater percentage is inversely proportional to motor load; as the variable drops, the load increases. In one exemplary embodiment, 1000% is a liquid-barrel load and a frozen load is 700-900%.

Ingredients for a frozen beverage mixture are provided from the ingredient supply 12 to the process flow block 14, which controls the flow of the ingredients into the freezing chamber 18 as directed by the controller 16. The controller 16 may comprise an appropriately programmed microprocessor and suitable memory devices. The frozen mixture consistency is controlled by any of a number of methods that turns on the refrigeration system 20 to freeze and turns off the refrigeration system 20 when the mixture reaches the desired consistency. Suitable operation of the controller 16 and other control instrumentation using circuit boards, volatile and non-volatile memory devices, software, firmware, and the like is described, for example, in U.S. Pat. No. 5,706,661 incorporated by reference above. The product is then dispensed through a dispensing valve 22.

Applicants have further created improved methods and apparatuses to monitor and control active-charge pressure of frozen beverage system through electronic sensing, although mechanic sensing is also within the scope of the present disclosure.

Figure 2:
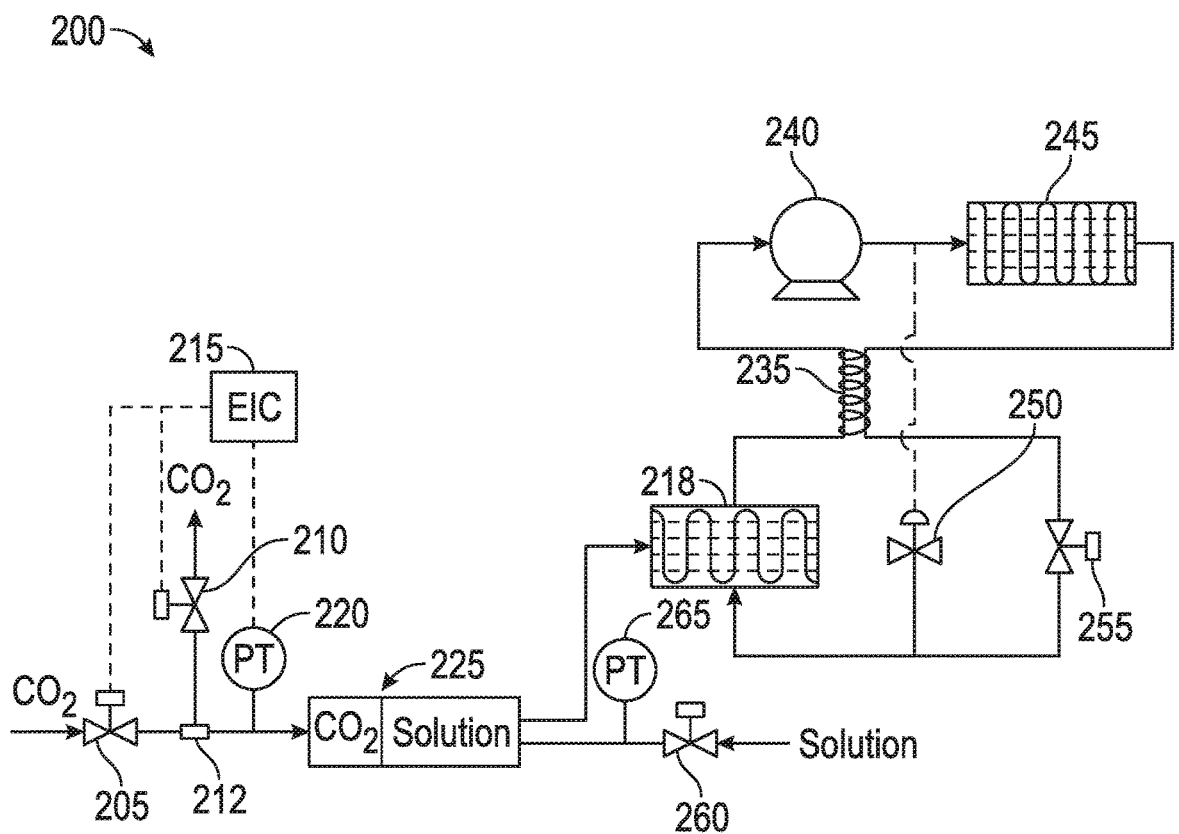
FIG. 2 is a schematic diagram of a frozen beverage machine in accordance with certain teachings of the present disclosure.
Figure 3:
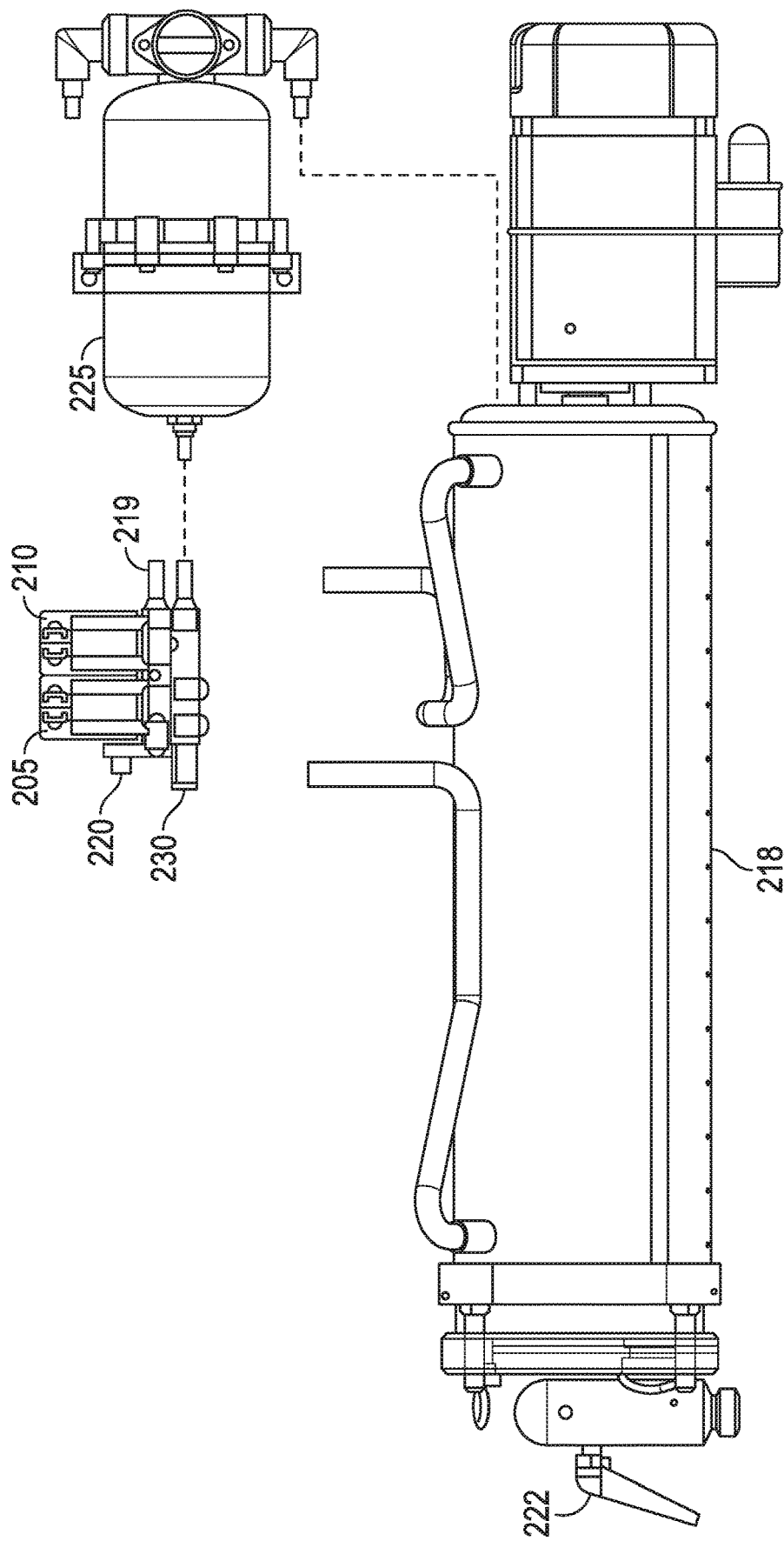
FIG. 3 is a view of a portion of the frozen beverage machine illustrated in FIG. 2 in accordance with certain teachings of the present disclosure.

As is shown in more detail in FIGS. 2 and 3, the dynamic charge control system (DCC) of the present invention typically consists of a pressure transducer 220, two electrically controlled solenoids 205, 210 to control supply and venting of gas, and a common manifold 212. DCC typically utilizes a pressure sensing technological device to monitor and control charge pressure by either supply or vent gas based on the user's desired pressure range, in other words, desired drink profile. The desired pressure range is dependent on the drink profile desired, and the user has the ability to change the pressure range electronically through a user interface.

FIG. 2 is a schematic diagram of a frozen beverage machine in accordance with certain teachings of the present disclosure. Referring to FIG. 2, the main components of a frozen beverage machine 200 are illustrated.

In the exemplary machine a general refrigeration system is provided that includes a compressor 240, a condenser 245, heat exchanger 235, defrost valve 250 and an expansion valve 255. The refrigeration system operates to provide refrigerant to the evaporation coils of a freezing chamber in the form of a barrel 218 either: (a) in the form of expanding liquid refrigerant through the expansion valves to cool the barrel or (b) in the form of hot gas form the compressor to defrost the barrel.

The exemplary machine also includes direct charge control system that includes an expansion tank 225 that receives beverage solution through a solution solenoid 260 and gas (typically $CO_2$ but may be air or some other inert gas) through a supply solenoid 205 (or in alternative embodiments a supply regulator). A pressure transducer 220 is provided to detect the charge pressure in the expansion tank 225. A pressure transducer 265 is provided to detect the solution pressure in the entering the expansion tank 225. The output from the pressure transducer 220 is provided to an electronic interface controller 215 that operates to control the charge pressure in the expansion tank 225. In alternative embodiments, multiple expansion tanks may be utilized.

FIG. 3 is a view of a portion of the frozen beverage machine illustrated in FIG. 2 in accordance with certain teachings of the present disclosure. In particular, FIG. 3 shows details of one embodiment of the expansion tank 225, the barrel 218, the dispensing valve 222, the supply solenoid 205, the exhaust solenoid 210 (or in alternative embodiments an exhaust regulator) and the pressure transducer 220. In the example, of FIG. 3, the solenoids 205 and 210 are electronically controlled solenoids and they are integrated into a single unit with the pressure transducer 220 which will produce a signal that can be received and processed by a control processor. Pressure may be vented through the pressure vent 230. $CO_2$ may be added through $CO_2$ pressure supply line 219.

Figure 4:
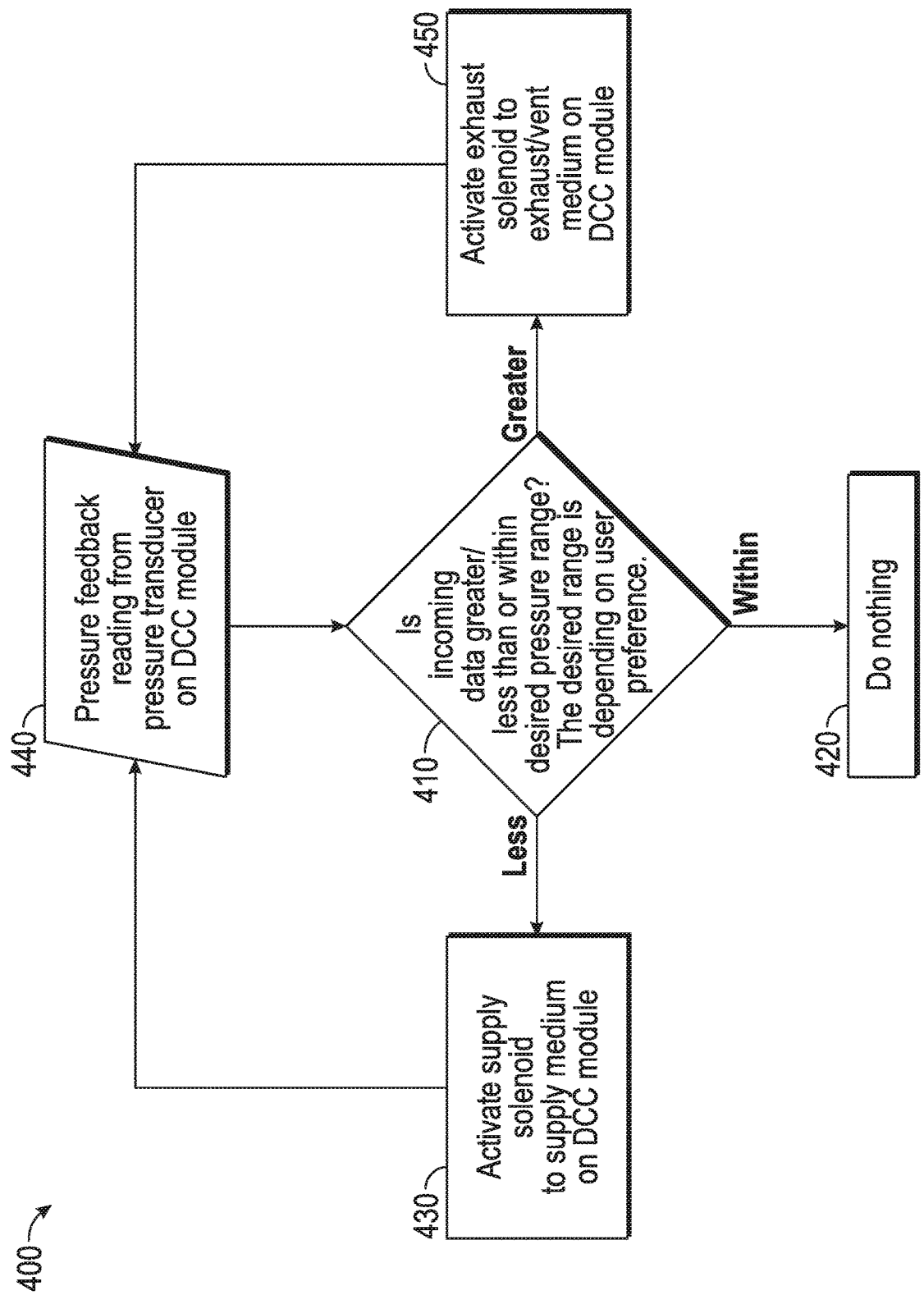
FIG. 4 is a flow diagram illustrating exemplary steps used in the control of a dynamic charge system in accordance with certain teachings of the present disclosure.

FIG. 4 is a flow diagram illustrating exemplary steps used in the control of a dynamic charge system in accordance with certain teachings of the present disclosure. FIG. 4 illustrates at a high level the method 400 used in the control of a dynamic charge system. In the initial step 410, after the pressure is measured, it is determined whether the pressure sensed by pressure detector 220 is greater than, less than or within the desired range depending on the user's preference, in other words, the desired drink profile. The range may be a range of values including for example a fixed setpoint/range and/or a dynamic setpoint/range. Setpoints, ranges and/or control logic for desired active charge pressure can be variable, and dependent on: (a) desired drink profile (e.g., lower pressures produce larger ice crystals, less CO2 absorption); (b) product type (fountain syrup vs FCB syrup; sugared syrup vs. low cal. Vs diet syrups); (c) machine hardware configuration (size of evaporator, expansion tank size, etc). Setpoints and/or control logic may be modified by a user interface. For example, a user may enter desired drink profile, product type, or machine hardware configuration. The user interface may include potentiometers, LCDs, or keypads.

If the pressure is within the range, in step 420, no change is made to the expansion tank 225. If the pressure if less than desired, in step 430, the supply solenoid is activated to provide medium (typically $CO_2$ but may be air or some other inert gas) to the expansion tank 225. If the pressure is greater than desired, in step 450, the exhaust solenoid 210 is activated to the exhaust/vent medium from the expansion tank 225 out the pressure vent 230. After either steps 430 or 450 is completed, in step 440, a pressure feedback reading from the pressure transducer 220 is made. After step 440, step 410 is completed and the loop begins again.

Figure 5A:
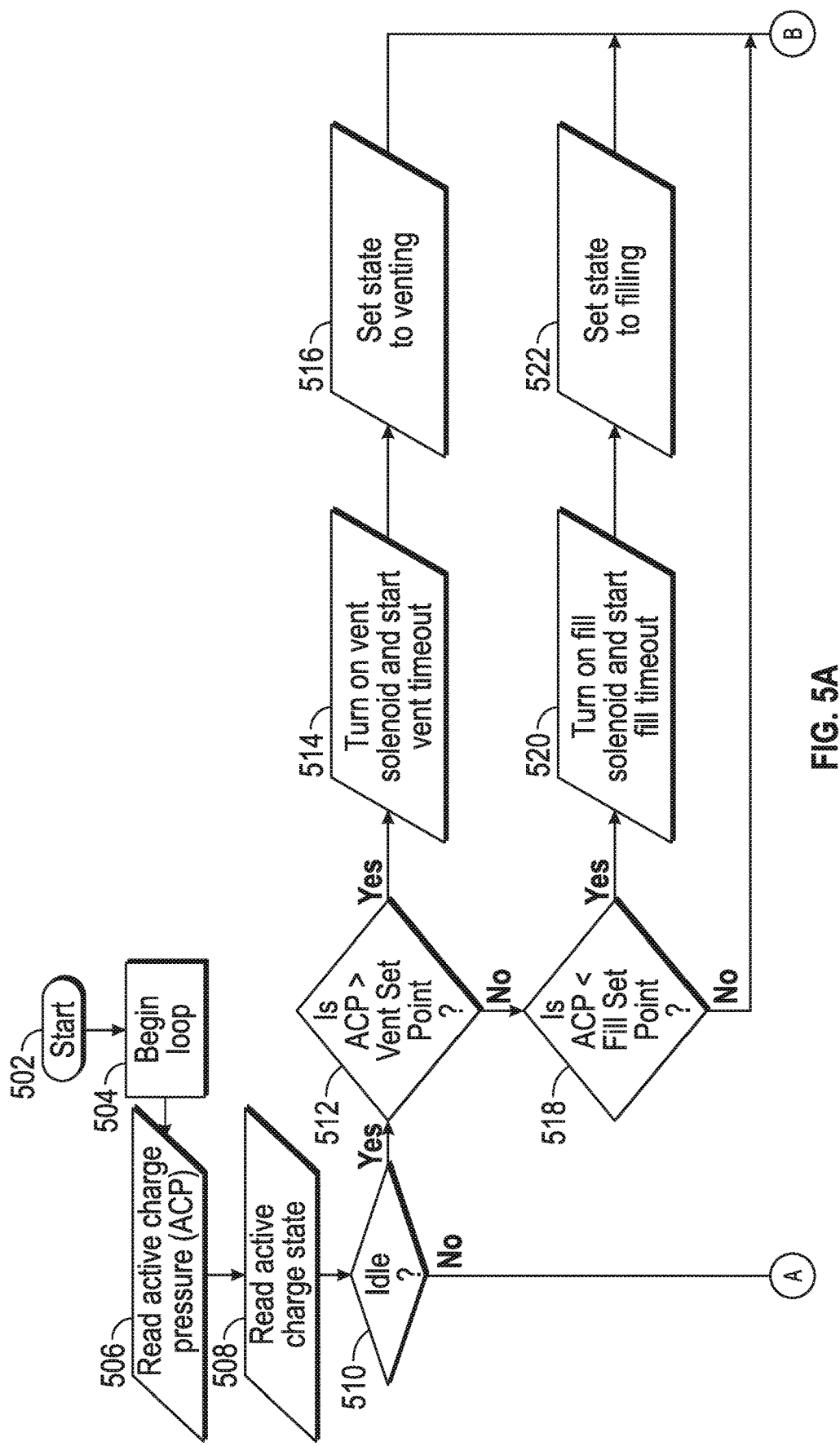
FIGS. 5A-5B are a flow diagram illustrating exemplary steps used in the control of a dynamic charge system in accordance with certain teachings of the present disclosure.
Figure 5B:
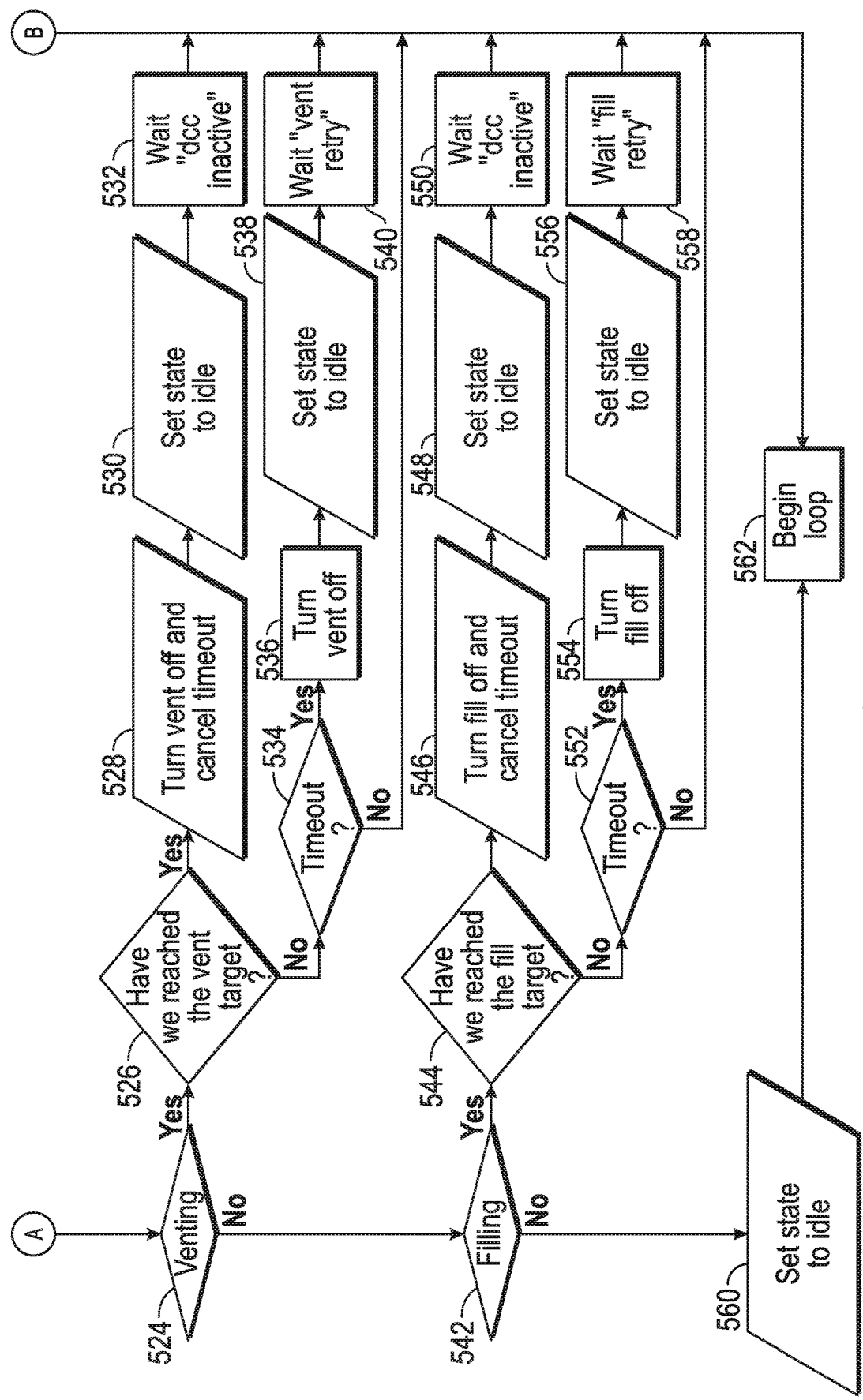

FIGS. 5A-5B are a flow diagram illustrating exemplary steps used in the control of a dynamic charge system in accordance with certain teachings of the present disclosure. FIGS. 5A-5B illustrate at a more detailed level an exemplary method that may be used in the control of a dynamic charge system and associated frozen beverage machine. The method starts at step 502. The control loop step 504 begins. The active charge pressure (ACP) is read in step 506 from pressure transducer 220. The active charge state may be read in step 508.

In step 510, it is determined whether the DCC system is idle. If the DCC system is idle, step 512 is followed. In step 512, it is determined whether the ACP is greater than the vent set point. The set point may be a range of values including for example a fixed setpoint/range and/or a dynamic setpoint/range. Setpoints and/or control logic for desired active charge pressure can be variable, and dependent on: (a) desired drink profile (e.g., lower pressures produce larger ice crystals, less CO2 absorption); (b) product type (fountain syrup vs FCB syrup; sugared syrup vs. low cal. Vs diet syrups); (c) machine hardware configuration (size of evaporator, expansion tank size, etc). Setpoints and/or control logic may be modified by a user interface. For example, a user may enter desired drink profile, product type, or machine hardware configuration. The user interface may include potentiometers, LCDs, or keypads.

If the ACP is greater, in step 514, the vent solenoid 210 is turned on and the vent timer is started. Next, in step 516, the state is set to venting. Next, in step 562, the flow diagram returns to begin loop, which is step 504, and begins again.

If the ACP is less than the vent set point, in step 518, it is next determined whether the ACP is less than the fill set point. If the ACP is less than a fill set point, in step 520, the fill solenoid 205 is turned on and the fill timer is set. Next, in step 522, the filling state is set. Next, in step 562, the flow diagram returns to begin loop, which is step 504, and begins again.

If in step 510, if the DCC system is not idle, next it is determined if the DCC system is venting in step 524. If it is determined that the DCC system is venting in step 524, next, in step, 526 it is determined whether the vent target has been reached. If the vent target has been reached, next, in step 528, the vent solenoid 210 is turned off and the vent timer is stopped. Next, in step 530, the state is set to idle. Next, in step 532, wait (delay) for a predetermined amount of time. Next, in step 562, the flow diagram returns to begin loop, which is step 504, and begins again.

If in step 526, it was determined that the vent target had been reached, next in step 534, it is determined whether the vent timeout has been reached. If the vent timeout of step 534 has been reached, the vent is turned off in step 536. Next, in step 538, the state is set to idle. Next, in step 540, wait (delay) for a predetermined amount of time. Next, in step 562, the flow diagram returns to begin loop, which is step 504, and begins again. If in step 534, it is determined that the vent timeout has not been reached, next, in step 562, the flow diagram returns to begin loop, which is step 504, and begins again.

If in step 524 that the DCC system is not venting, next, in step 542 it is determined if the DCC system is filling. If the DCC system is filling, next, in step 544, it is determined whether the fill target has been reached. If the fill target has been reached, next, in step 546, the fill is turned off and the fill timeout is cancelled. Next, in step 548, the idle state is set. Next, in step 550, wait(delay) for a predetermined amount of time.

If in step 544, it was determined that the fill target had been reached, next in step 552, it is determined whether the fill timer reached has expired. If the fill timeout of step 552 has been reached, the vent is turned off in step 554. Next, in step 556, the state is set to idle. Next, in step 558, wait(delay) for a predetermined amount of time. Next, in step 562, the flow diagram returns to begin loop, which is step 504, and begins again. If in step 552, it is determined that the fill timeout has not been reached, next, in step 562, the flow diagram returns to begin loop, which is step 504, and begins again.

If in step 542, it is determined that the filling is not occurring, next, in step 560, the state is idle. Next, in step 562, the flow diagram returns to begin loop, which is step 504, and begins again.

The order of steps of FIGS. 5A-4B can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The other potential benefits of the methods and apparatuses disclosed in FIGS. 2-5 and the associated written specification are as follows: (a) may allow the freezing chamber pressure to be maintained in a tighter range or with higher accuracy; (b) may allow a user to interact with the system and make various drink profiles through a user interface rather than manually adjusting the regulated pressure or physically change out regulator; (c) may eliminate over/under pressurization problems that may occur due to the drift or inaccuracy of the mechanical regulator (high barrel pressure may lead to undesirably high dispense rates and unpredictable consistency); (d) may maintain better frozen product consistency due its ability to control freezing chamber pressure more precisely and consistently than a mechanically operated active charge system; (e) may maintain proper barrel liquid level through its ability to control freezing chamber pressure precisely and consistently; and (f) maintain better gas solubility due to its ability to tightly control chamber pressure during freezing.

Applicants have further created improved methods for improving the drink quality of drinks dispensed from frozen beverage machines that includes improvements to one of more of the following the fill, refreeze, and defrost logic that controls the frozen beverage machines.

Figure 6:
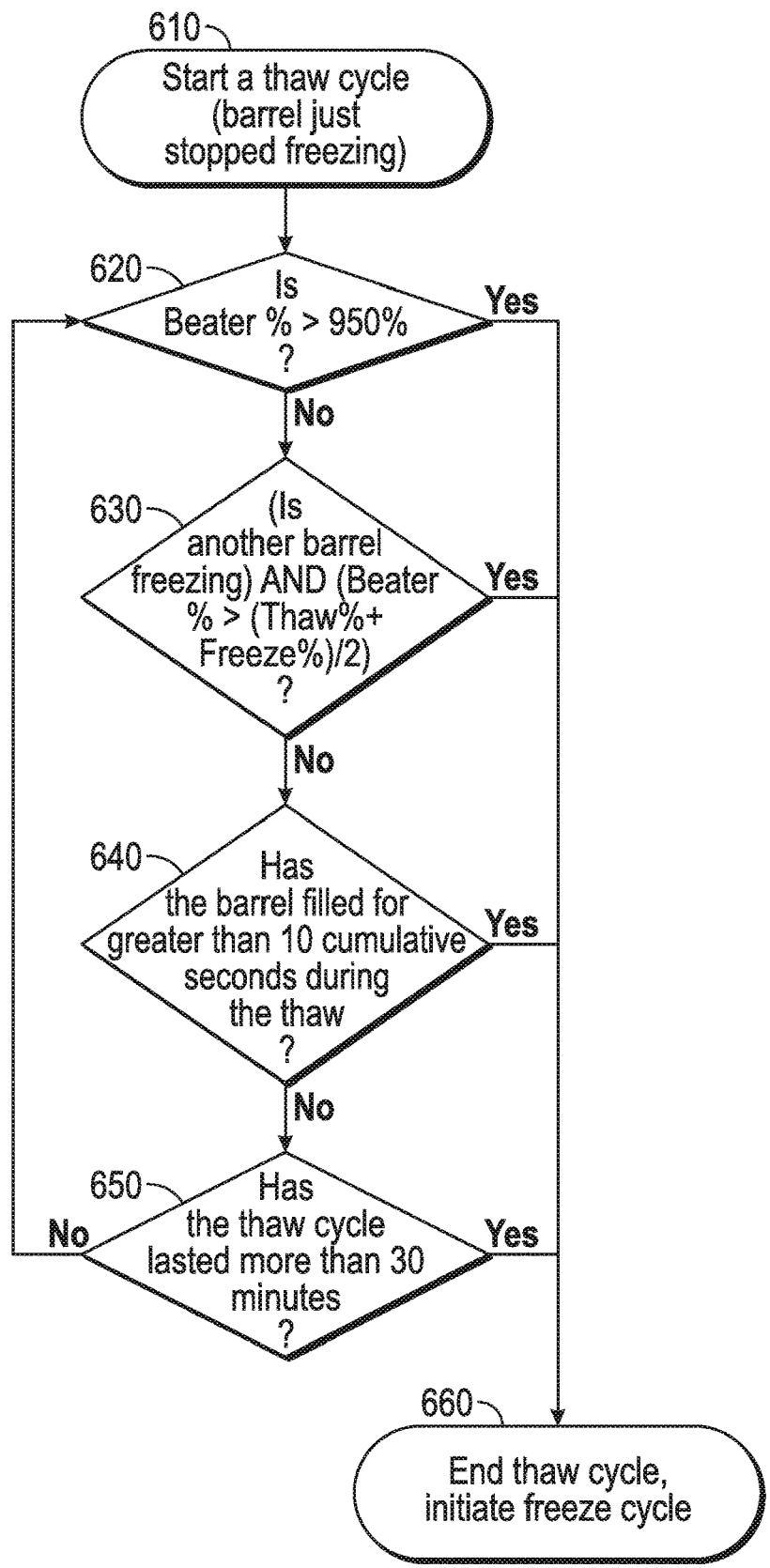
FIG. 6 is a flow diagram illustrating an exemplary refreeze logic of a frozen beverage machine in accordance with certain teachings of the present disclosure.

FIG. 6 is a flow diagram illustrating the refreeze logic of a frozen beverage machine according to certain teachings of the present disclosure. The following method for improving the drink quality of drinks dispensed from frozen beverage machines includes an improved refreeze logic that controls the frozen beverage machines. When a barrel 18 is on and has completed its initial pull down (IPD), the frozen beverage machine 10 is designed to detect when the drink consistency is not acceptable. Barrel 18 is designed to be ready to serve consistent drinks at nearly all times. The frozen beverage machine 10 maintains the liquid consistency in the barrel in an acceptable range by refreezing the barrel occasionally. The logic used to initiate a refreeze of the barrel is based on a combination of conditions. The barrel will refreeze at the end of the thaw cycle 660 if one or more of the following conditions are met:

In the first condition 620, the decision of whether or not to end the thaw cycle and initiate the freeze cycle 660 is based on the beater motor's torque/power. For example, if the load/power consumption of the beater motor decreases below a threshold, the thaw cycle ends and the freeze cycle is initiated 660. The threshold used to determine whether this condition is satisfied and to begin the refreeze cycle is typically a beater percentage measurement of 950%, but other beater percentages (or ranges) are contemplated based on various factors. The desired thickness of the product may be a user setting. If the user wants a thicker drink, the threshold is lowered and vise versa. If the first condition 620 is satisfied, the thaw cycle ends and the freeze cycle is initiated 660. If the first condition 620 is not satisfied, the second condition 630 may be checked.

In the second condition 630, the decision of whether or not to end the thaw cycle and initiate the freeze cycle 660 is based on whether to synchronize with a second barrel that is freezing. For example, when a second barrel is freezing and the barrel in question is half-way thawed, the half-way thaw point is determined by the beater motor's load and is calculated by the formula: ([Thaw% Threshold]+[Freeze% Threshold])/2). Thaw % and Freeze% thresholds are typically default values in the machine based on empirical testing; however, the user interface allows for the thresholds to be shifted up or down based on if the users wants a thicker or thinner drink. If the second condition 630 is satisfied, the thaw cycle ends and the freeze cycle is initiated 660. If the second condition 630 is not satisfied, the third condition 640 may be checked.

In the third condition 640, the decision of whether or not to end the thaw cycle and initiate the freeze cycle 660 is based on the amount of product dispensed while thawing. For example, has the barrel been filled for greater than ten cumulative seconds during the current thaw cycle. This is determined by whether the solution solenoid 260 (shown in FIG. 2) has been activated for ten cumulative seconds during the current thaw cycle. As frozen product is being dispensed from the barrel, the pressure drop in barrel activates the solution solenoid to allow solution to replenish the barrel. The solution may be injected at a rate of 1.8 ounces per second, but other injection rates are contemplated. Assuming a rate an injection rate of 1.8 ounces per second, eighteen ounces of solution is typically injected into the barrel when the solution solenoid is open for ten seconds. After 18 oz of solution is added to the barrel, the drink quality falls outside of the acceptable range, the barrel must be frozen. If the third condition 640 is satisfied, the thaw cycle ends, and the freeze cycle is initiated 660. If the third condition 640 is not satisfied, the fourth condition 650 may be checked.

In the fourth condition 650, the decision of whether or not to end the thaw cycle and initiate the freeze cycle 660 is based on the length of the thaw cycle. For example, if the time since the last freeze exceeds 30 minutes, although other times are contemplated, the machine will turn on the refrigeration system to refreeze the barrel. If the fourth condition 650 is satisfied, the thaw cycle ends and the freeze, cycle is initiated 660. If the fourth condition 650 is not satisfied, the first condition 620 may be re-checked. This cycle may continue until one of the conditions is satisfied and the thaw cycle ends and the freeze cycle is initiated 460.

The order of the conditions 620, 630, 640, 650 may be set in any order. One or more of the conditions 620, 630, 640, 650 may be omitted. For example, the fourth condition 650 may be tested first and if satisfied the thaw cycle ends and the freeze cycle is initiated 660.

The following method for improving the drink quality of drinks dispensed from frozen beverage machines includes an improved defrost logic that controls the frozen beverage machines. The purpose of defrost is to prevent drink quality from falling outside of the acceptable range over a long period of time, and also to prevent ice build-up in barrel that could potentially clog up the dispensing valve. Other machines typically defrost every two to four hours. One of the main benefits of the freeze logic described above is that the barrels do not form ice as quickly. Consequentially, the barrels do not need to be defrosted as often. Using this method, only defrosts each barrel every six to nine hours, or a total of three defrosts per day, per barrel. Once a defrost cycle is initiated, the barrel defrost process is terminated by the barrel's return temperature exceeding 50° F. or the length of the defrost exceeding 15 minutes.

Figure 7:
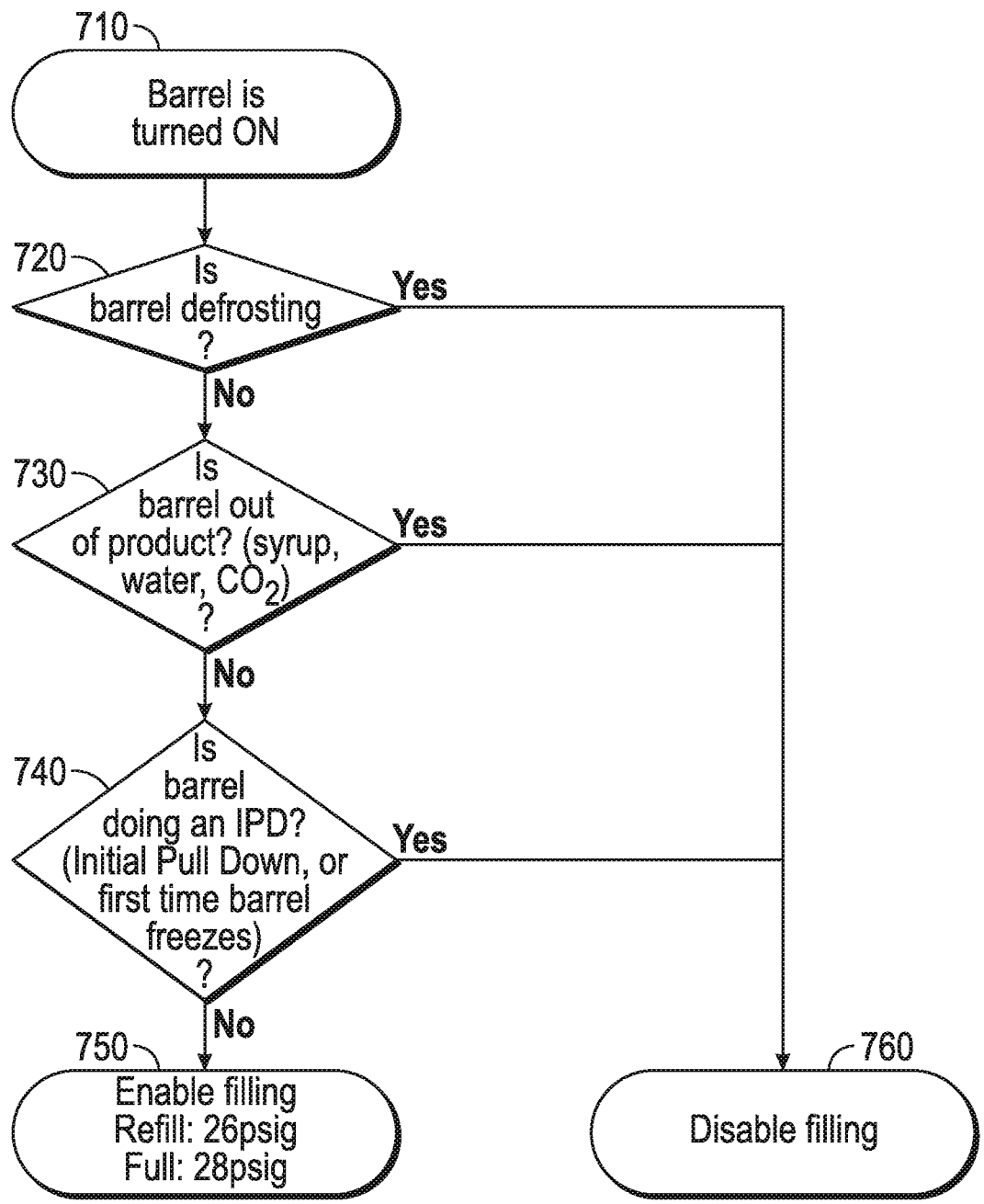
FIG. 7 is a flow diagram illustrating an exemplary fill logic of a frozen beverage machine in accordance with certain teachings of the present disclosure.

The following method for improving the drink quality of drinks dispensed from frozen beverage machines includes an improved fill logic that controls the frozen beverage machines. FIG. 7 is a flow diagram illustrating the fill logic of a frozen beverage machine in accordance with certain teachings of the present disclosure. The following method for improving the drink quality of drinks dispensed from frozen beverage machines includes an improved fill logic that controls the frozen beverage machines. Initially, the barrel is turned on 710. The barrel's pressure is typically maintained between 26 pounds per square inch (psig) and 28 psig when filling is enabled for a frozen carbonated beverage (FCB) syrup. Filling the barrel with additional liquid is not always allowed and is dependent on the state of the barrel. Filling is disabled 760 (i.e. not permitted) if one or more of the following conditions are true: (i) the barrel is defrosting 720, (ii) the barrel is out of product (e.g. syrup, water, or $CO_2$) 730; or (iii) the barrel is doing an initial pull down (IPD) or when the barrel first freezes down 740.

If the above conditions are not true, then filling is enabled 750 when the machine is on. When filling is enabled, the machine will fill to 28 psig when the pressure in barrel drops below 26 psig. The refill and full pressures were chosen to be 26 psig and 28 psig respectively in order to be relatively close to the active-charge pressure on the expansion tanks. The active charge pressure is set to 30 psig. Having the full pressure 2 psig within the active charge pressure reduces the fluctuation in barrel pressure over time. The order of the steps 720, 730, 740 may be set in any order. One or more of the steps 720, 730, 740 may be omitted. Other pressure ranges are contemplated based on various conditions within a frozen beverage machine.

Applicants have further created methods and apparatuses for refrigeration priming for remote condensed applications in a frozen beverage machine. These methods and apparatuses utilize various methods and refrigeration system configurations, such as utilizing temperature and pressure sensors, mass flow valves and check valves, to determine if it is necessary to run a priming cycle before a hot-gas bypass operation can be completed properly on a remote condenser refrigeration system or frozen beverage dispenser. This priming cycle attempts to draw refrigerant into the system from the condenser unit. The priming operation itself may be implemented by closing the refrigeration bypass and allowing refrigerant to flow through the expansion devices. Typically, the priming process will conclude either on a successful priming cycle or on the expiration of a timer.

Frozen beverage dispensers operate by cycling between a frozen and thawed state. Over time ice crystal buildup in the beverage will effect dispenser operation and so must be periodically defrosted back to its original liquid state. Utilizing a hot-gas bypass defrost process in a remote condensed, vapor-compression refrigeration system can be problematic when the air temperature surrounding the remote condenser is much colder than the dispenser evaporator's ambient temperature. Hot-gas bypass defrosting process may utilize the refrigerants thermal energy (generated by the compressor's heat of compression & motor input power) to effect a beverage defrost cycle. During cold weather, the refrigerant will migrate to the coldest location in the refrigeration system, i.e. to the condenser unit during freezing and subfreezing weather conditions. Consequently, the migration of refrigerant to the remote condenser can reduce the effectiveness of a hot-gas bypass defrosting operation.

The objective of these methods and systems of refrigerant priming is to determine if a thermal condition in the beverage cooler or dispenser exists that will prevent the effective use of a hot-gas bypass defrost cycle. If this poor condition exists, the system will then attempt to rectify the problem by refrigerant priming or filling the evaporators with refrigerant. The system can automatically end the refrigerant priming process cycle by determining if the process was successful using available physical data.

On some frozen beverage dispensing equipment, the compressor will be contained in the dispenser and the liquid refrigerant receiver will be mounted in the remote condenser housing. In this arrangement, a hot-gas bypass defrost operation at the evaporator may only utilize the refrigerant remaining in the dispenser itself. During cold ambient conditions, enough refrigerant migration may occur to render a hot-gas bypass defrosting operation ineffective or non-operational. Compressor damage may also occur because of refrigeration migration.

Figure 8:
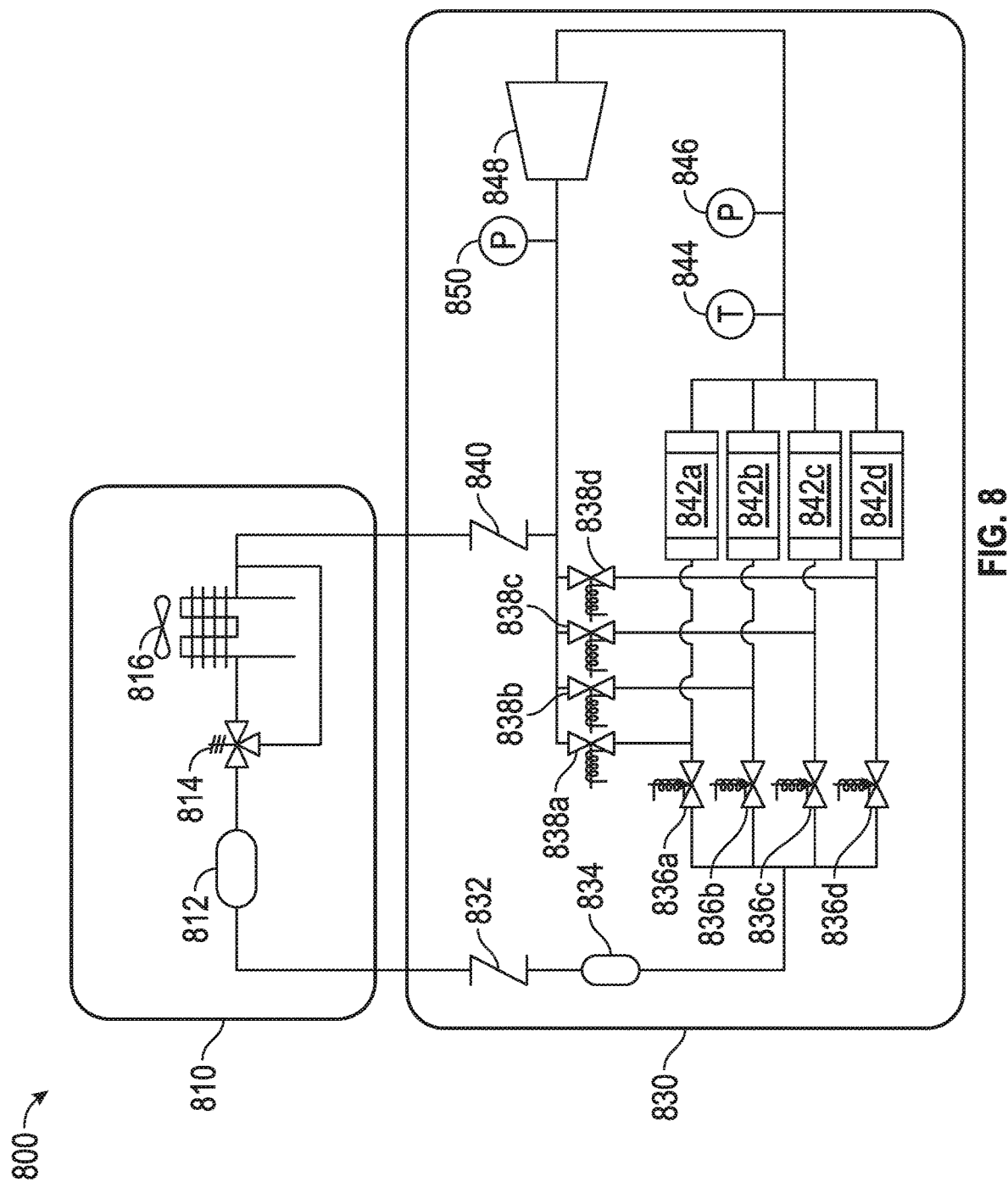
FIG. 8 is a schematic diagram for an exemplary refrigeration system with a remote condensing unit in accordance with certain teachings of the present disclosure.

FIG. 8 is a schematic diagram for an exemplary refrigeration system 800 with a remote condensing unit in accordance with certain teachings of the present disclosure. This refrigeration system is designed for a frozen beverage machine, such as those disclosed herein, but may be utilized in other types of systems that use a refrigeration system.

Referring to FIG. 8, the system includes a remote condensing unit 810 that comprises an air-cooled condenser 816 coupled to a head pressure control valve 814 and a receiver 812. In general operation, the air-cooled condenser 816 receives working fluid in the form of a hot, high-pressure gas. The high pressure gas flows through the air-cooled condenser 816, and cools to form a liquid. The pressure across the air-cooled condenser 816 is maintained by the head pressure control valve 814. The liquid refrigerant flowing from the air-cooled condenser 816 through the head pressure control valve 814 is received by receiver 812 where excess refrigerant will be stored.

Refrigeration system 800 also includes a dispensing unit 830 that includes check valves 832 and 840, filter/dryer 834, expansion valves 836a-836d, evaporator barrels 842a-842d and compressor 848. The check valves 832 and 840 are intended to control the direction of refrigerant flow through the system and ensure that refrigerant flows through the condenser 816 and receiver 812, to the expansion valves 836a-836d and the evaporator barrels 842a-842d, and then through the condenser (or generally counterclockwise with respect to the system of FIG. 8). More or less evaporator barrels (and corresponding expansion valves are envisioned and in accordance with certain teachings of the present disclosure).

In general, when cooling is desired for one or more barrels, the expansion valve associated with the barrel or barrels to be cooled will be open and the compressor 848 will be activated. Liquid refrigerant will then tend to flow from the receiver 812, through check valve 832 and filter/dryer 834, through the open expansion valve(s) 836*a*-836*d* and then through the corresponding evaporator barrel 842*a*-842*d* where the liquid will absorb heat and transition to a hot gas. The hot gas will flow into the compressor 848 where the refrigerant will be compressed and the cycle will repeat.

In the embodiment of FIG. 8, sensors are provided for sending the suction temperature 844, suction pressure 846 and discharge pressure 850. Hot gas bypass valves 838*a*-838*d* are also provided for use in defrost and other processes as described more fully herein. In general, a hot-bypass defrost operation is performed for one or more of the freezing barrels by closing the expansion valves 836*a*-836*d* for such barrels while opening the corresponding hot-bypass valve 838*a*-838*d* for such barrels. Under these situations, refrigerant in the evaporator barrels will flow through the barrels 842*a*-842*d*, into the compressor 848 to be compressed to a hot gas, and then through the open hot gas bypass valve(s) 838*a*-838*d*, and back through the evaporator barrels 842*a*-842*d* associated with the open bypass valves to enable a defrost application.

In many applications in which remote condensers, like remote condensing unit 810 of FIG. 8, are used, the remote condenser is placed in an exterior location where it is exposed to the environment and to ambient temperatures. In such applications, especially during cold outdoor conditions, the refrigerant in the system can migrate to the outdoor condensing unit and become pooled in the unit. The migration of the refrigerant to the outdoor condensing unit can be problematic in systems where hot-bypass defrost operations are desired. This is because the effectiveness and efficiency of a hot-bypass defrost operation will depend in large part on the amount of refrigerant within the dispensing unit 830 at the time the hot bypass operation is initiated. If, at that time, insufficient refrigerant is in the dispensing unit 830—because it is pooled in the outdoor condensing unit 810—the hot bypass operation either will operate inefficiently or will not defrost the barrels to be defrosted in the appropriate time period or to the desired extent.

To overcome the issue described above, the system described herein can use a form of intelligent priming to ensure that an appropriate amount of refrigerant is in the dispensing unit 830 when a hot bypass operation is initiated.

Figure 9:
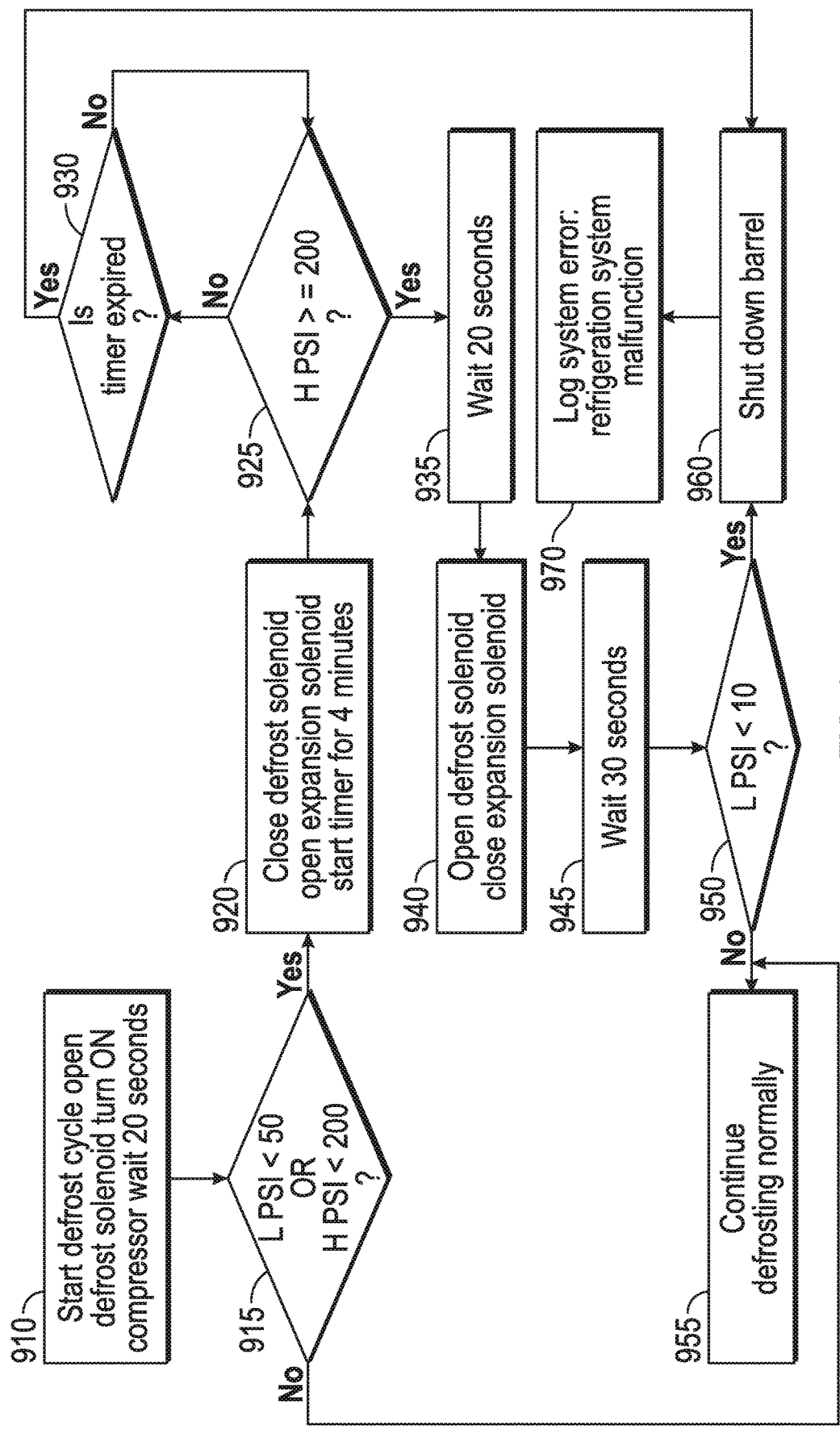
FIG. 9 is a flow chart illustrating an exemplary method for refrigeration priming for remote condensed applications in accordance with certain teachings of the present disclosure.

FIG. 9 is a flow chart illustrating an exemplary method for refrigeration priming for remote condensed applications in a frozen beverage machine like the one illustrated in FIG. 8. The determination of if a refrigeration prime is necessary is handled by a control system, which is typically electronic, that monitors refrigeration pressure, temperature or a combination of the two.

In step 910, the defrost cycle is started, the defrost solenoid (e.g. hot gas bypass valves 838*a*-838*d*) is opened, the compressor is turned on, and a delay of twenty seconds occurs. At the end of the twenty seconds, in step 915, the low side refrigeration pressure (e.g. suction pressure) and the high side refrigeration pressure (e.g. discharge pressure) is checked. This can be measured directly through pressure transducers or indirectly through temperature sensors. If the low side refrigeration pressure and the high side refrigeration pressure are within nominal operating conditions for the compressor, in step 955, the defrosting is continued normally. If the low side refrigeration pressure and the high side refrigeration pressure are not within nominal operating conditions for the compressor, in step 920, the defrost solenoid is closed, the expansion solenoid is open, and the start time is set for four minutes. For this example, if the low side refrigeration pressure is below 50 pounds per square inch (PSI) or the high side refrigeration pressure is less than 200 PSI then, in step 920, the defrost solenoid is closed, the expansion solenoid is open, and the start time is set for four minutes. Step 920 is when the hot-gas bypassed is suspended and the prime cycle begins. To prime the system, as is shown in step 920 all bypass valves (e.g. hot gas bypass valves 838*a*-838*d*) are closed and the expansion devices (e.g. 836*a*-836*d*) are utilized in a manner consistent with the systems normal freezing or cooling routine. If electronic valves are used, they should be opened fully to allow the largest amount of refrigerant flow. The system is then allowed to run and attempt to draw refrigerant from the condenser unit.

During the priming process, sensor readings may be continuously monitored. The sensors are looking for the pressures to cross-operating parameters or temperature sensors to indicate the flow of refrigerant in the system. This is shown in step 925. For example, as is shown in step 925, if the high side refrigeration pressure is above or equal to 200 PSI then, step 935 shows the system waits 20 seconds. Alternatively, in another example, if the low side refrigeration pressure is above 30 pounds per square inch (PSI) and the high side refrigeration pressure is above 100 PSI then, step 935 shows the system waits 20 seconds. Next, per step 940, the defrost solenoid is open and the expansion solenoid is closed. Next, per step 945, the system waits 30 seconds followed by step 950 where the low side refrigeration pressure is checked again to determine if it is less than 10 PSI. If it is not, step 955 shows that the defrosting continues normally. If step 950 is not satisfied, then barrel is shut down in step 960 and then a log system error is registered in step 970. Steps 925-955 show that once the nominal operating conditions are met, the prime operation is halted and the hot-gas procedure is resumed. The system may initialize different timers or none at all during the priming procedure. If nominal operating conditions are not satisfied in step 925, a timer is set that will for a period of time continually check and loop between step 930 and 925 until the timer expires, in which case the process proceeds to steps 960 (shutting down the barrel) and 970 (log system error). If the system does not complete its prime operation in the allotted period of time, the operation can be halted and a fault triggered such as is shown in step 970. It should be noted that the equations shown in this and other figures are only exemplary. Other calculations are shown and other calculations may be used to accomplish the same goal.

Figure 10:
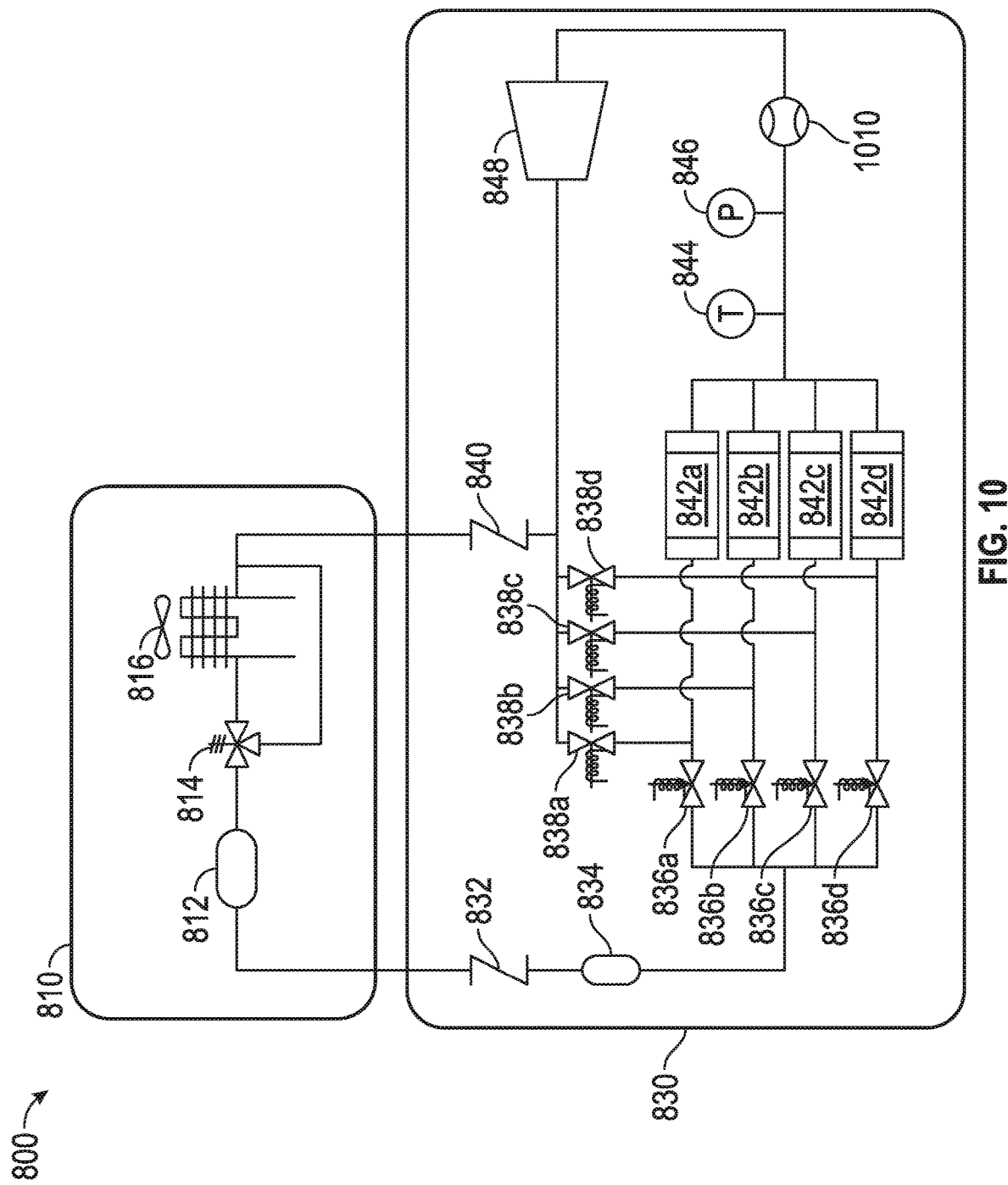
FIG. 10 is a schematic diagram for an exemplary alternative refrigeration system with a remote condensing unit in accordance with certain teachings of the present disclosure.

FIG. 10 is a schematic diagram for an exemplary alternative refrigeration system with a remote condensing unit in accordance with certain teachings of the present disclosure. FIG. 10 is similar to FIG. 8, however, FIG. 10 includes a mass flow meter 1010. Mass flow meter 1010 may be used in an alternative and as a supplement to the various methods and apparatuses disclosed in the present disclosure. As is shown in FIG. 10, the refrigeration system has an integrated mass flow meter 1010. During a defrost cycle, the controller for the system will measure the refrigerant mass flow rate 1010. If the mass flow rate is below a particular value, then the controller will initiate a priming cycle, such as is described in FIG. 9. The priming cycle may continue for a fixed length of time or until the mass flow rate of the mass flow meter 1010 has reached a desired amount.

Figure 11:
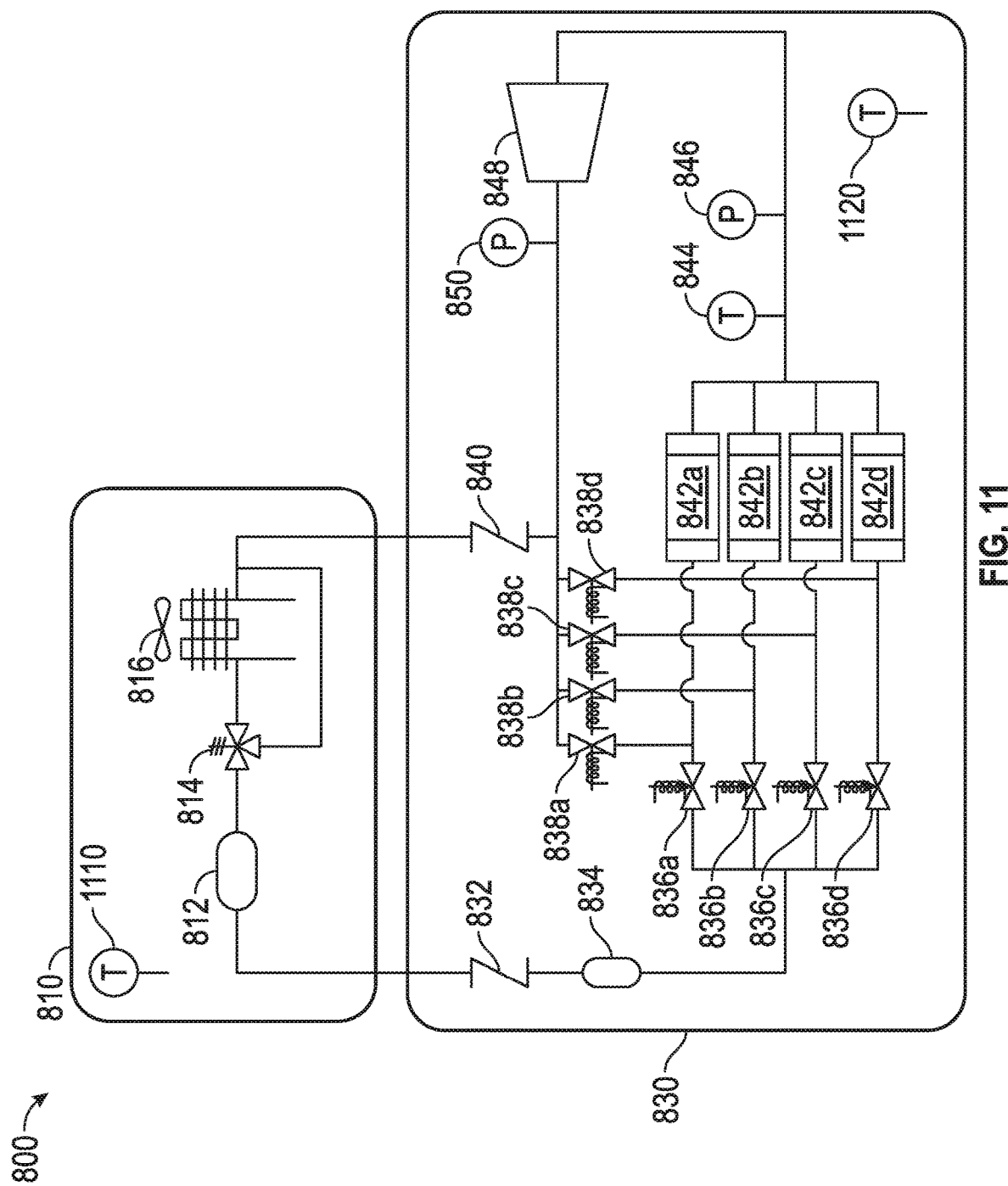
FIG. 11 is a schematic diagram for an exemplary alternative refrigeration system with a remote condensing unit in accordance with certain teachings of the present disclosure.

FIG. 11 is a schematic diagram for an exemplary alternative refrigeration system with a remote condensing unit in accordance with certain teachings of the present disclosure. FIG. 11 is similar to FIG. 8, however, FIG. 11 includes an ambient temperate sensor 1110 at or near the remote condensing unit 810 and an air temperature sensor 1120 at or near the evaporators 836*a-d*. Ambient temperate sensor 1110 and air temperature sensor 1120 may be used in an alternative and as a supplement to the various methods and apparatuses disclosed in the present disclosure. As is shown in FIG. 11, the ambient temperature (determined by an ambient temperate sensor 1110) at or near the remote condenser unit 810 and the ambient temperature (determined by air temperature sensor 1120) at or near the evaporators 836*a-d* can be monitored. The difference between these temperatures is proportional to the rate at which refrigerant will migrate to the remove condensing unit 810, or migrate to the evaporators 836*a-d*. The rate of refrigerant migration may then be calculated. Next, it is determined whether the refrigeration system 800 has enough refrigerant to effectively complete a hot-gas bypass defrost procedure, such as is shown in FIG. 9. The amount of refrigerant that a defrost cycle would use is a function of the time since the machine was last run in freezing mode and the ambient temperature difference between the evaporator(s) 836*a-d* and the remote condensing unit 810.

Figure 12:
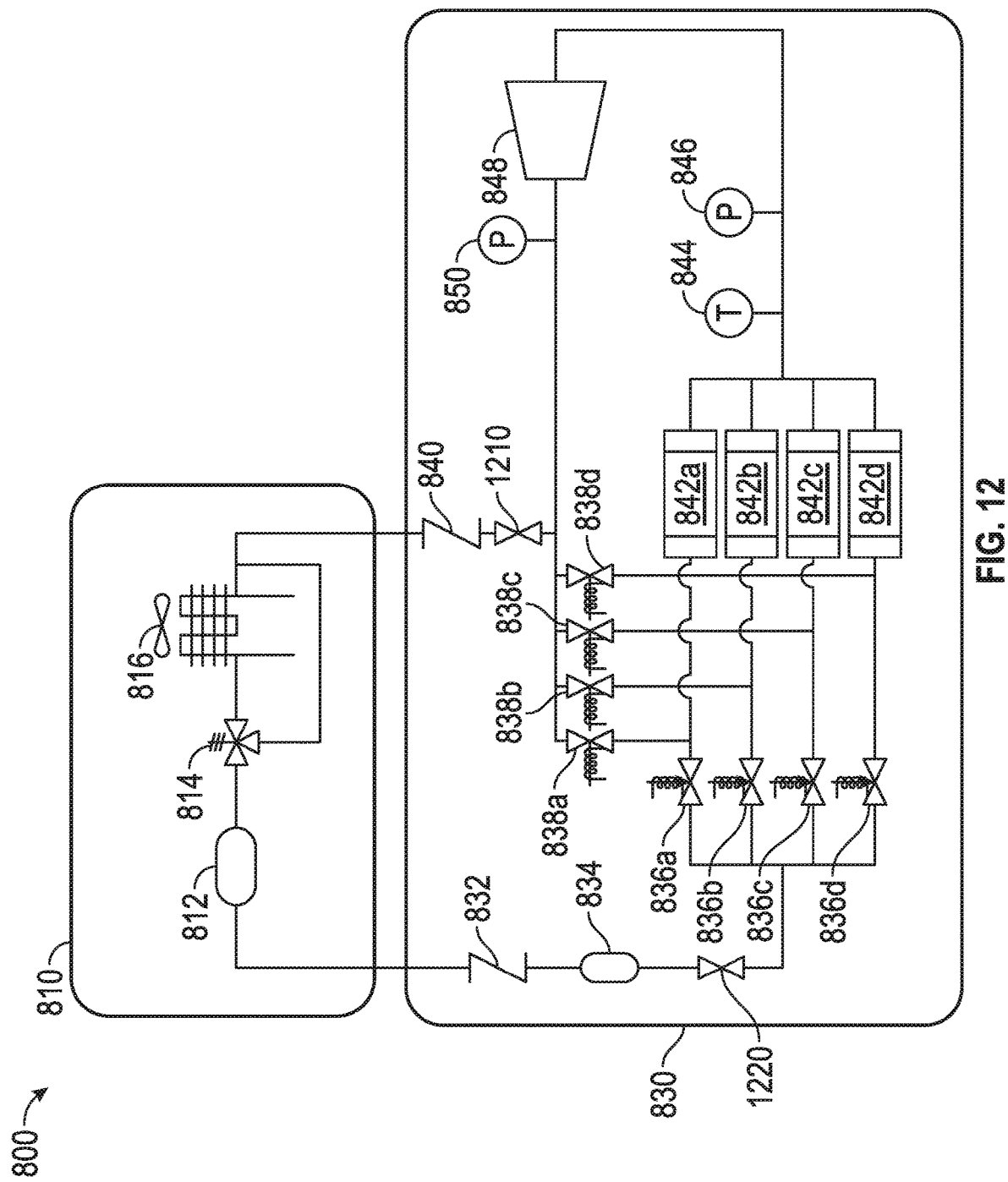
FIG. 12 is a schematic diagram for an exemplary alternative refrigeration system with a remote condensing unit in accordance with certain teachings of the present disclosure.

FIG. 12 is a schematic diagram for an exemplary alternative refrigeration system with a remote condensing unit in accordance with certain teachings of the present disclosure. FIG. 12 is similar to FIG. 8, however, FIG. 12 includes an isolation valve 1210 at the exit of the refrigeration flow from the dispensing unit 830 to the remote condensing unit 810 and an isolation valve 1220 at the entrance or near the entrance to the remote condensing unit 810 from the refrigeration flow from the dispensing unit 830. Isolation valves 1210, 1220 may be located in other locations to control the flow of the refrigeration through the refrigeration system 800. Isolation valves 1210, 1220 may be used in an alternative and as a supplement to the various methods and apparatuses disclosed in the present disclosure. As is shown in FIG. 12, to prohibit the migration of refrigerant to the remote condensing unit 810 or the compressor 848, isolation valves 1210, 1220 could be placed in the refrigerant lines going between the dispensing unit 830 and the remote condensing unit 810. The isolation valves 1210, 1220 would be normally closed. When freezing, the isolation valves 1210, 1220 would be energized open. During a refrigerant priming and defrost cycle as described herein or in other known embodiments, the isolation valves 1210, 1220 would be open or left closed at the appropriate time in the cycle.

Figure 13:
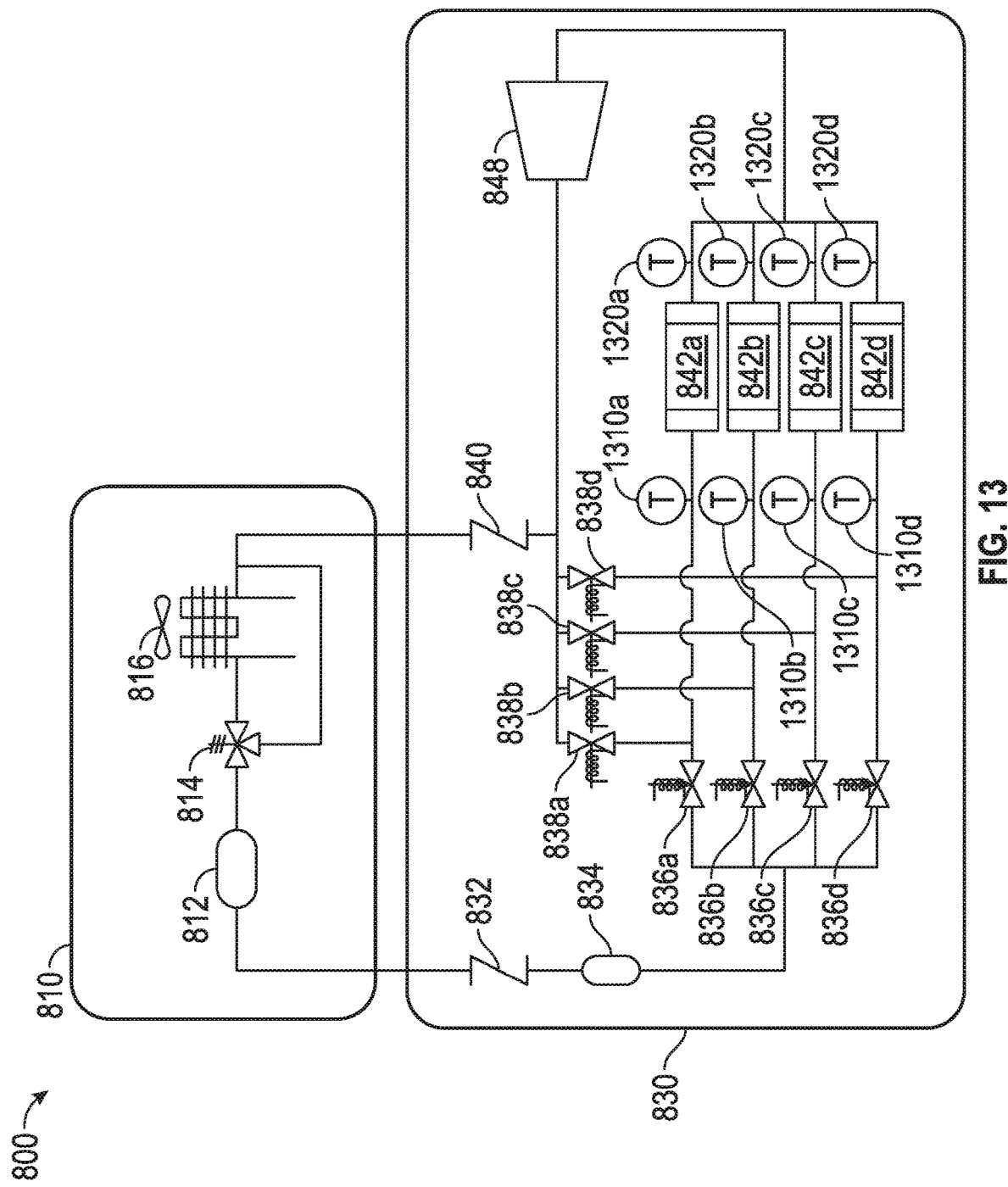
FIG. 13 is a schematic diagram for an exemplary alternative refrigeration system with a remote condensing unit in accordance with certain teachings of the present disclosure.

FIGS. 13, 14 illustrate an exemplary alternative method and apparatus for controlling a refrigeration system with a remote condensing unit in accordance with certain teachings of the present disclosure.

FIG. 13 is a schematic diagram for an exemplary alternative refrigeration system with a remote condensing unit in accordance with certain teachings of the present disclosure. FIG. 13 is similar to FIG. 8, however, FIG. 13 includes an inlet temperature sensors 1310*a-d* on the refrigeration inlet line(s) into the barrel(s) 942*a-d* and outlet temperature sensors 1320*a-d* on the refrigeration outlet line(s) out of the barrel(s) 942*a-d*. Inlet temperature sensors 1310*a-d* and outlet temperature sensors 1320*a-d* may be used in an alternative and as a supplement to the various methods and apparatuses disclosed in the present disclosure. The refrigeration machine 800 schedules a defrost cycle after one or more or the barrels 842*a-d* has completed a freeze cycle. If a defrost cycle is needed and cannot "piggyback" off of a freeze, then the refrigeration machine 800 will be prime.

Figure 14A:
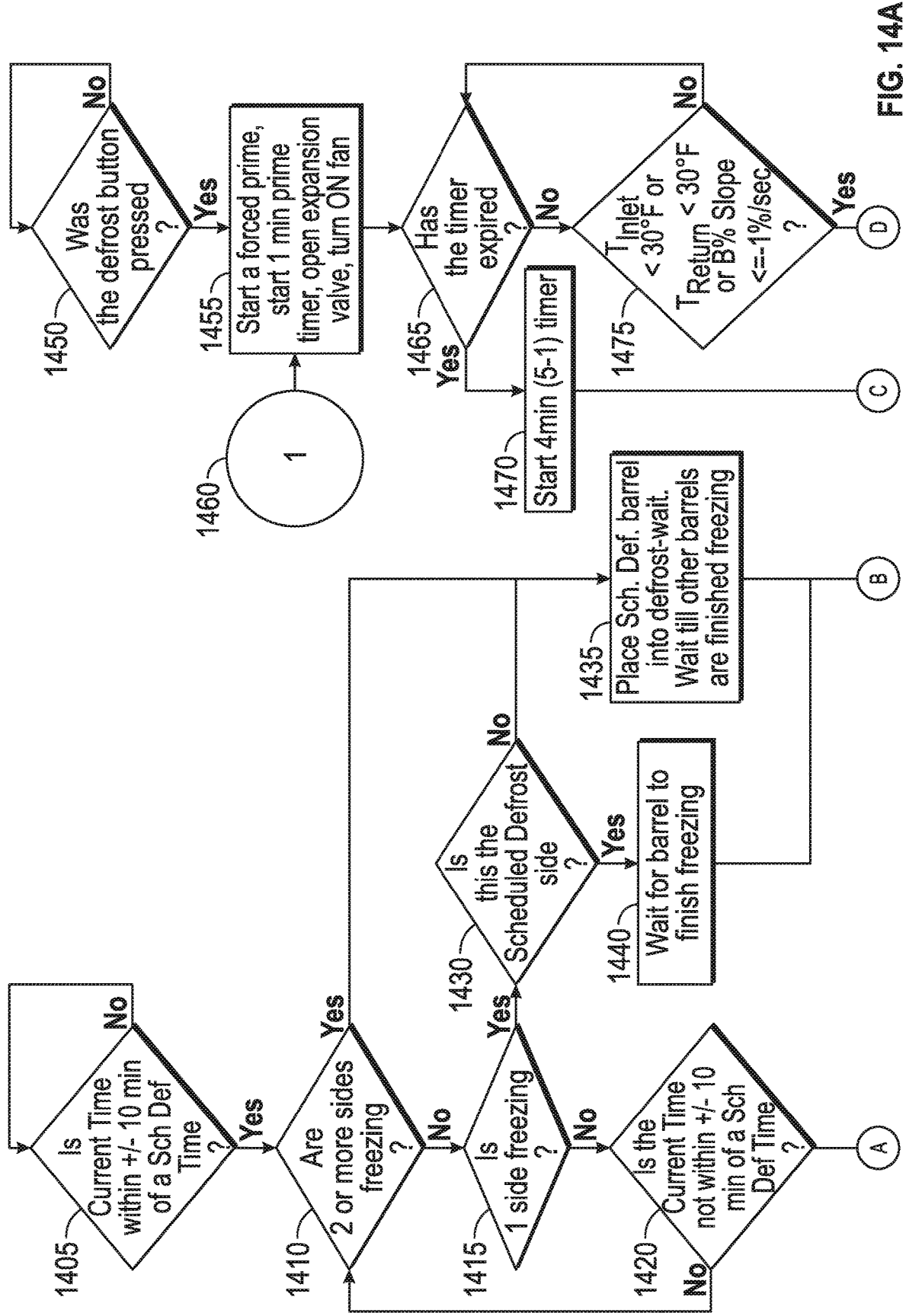
FIGS. 14A-14B are a flow chart illustrating a further exemplary method for controlling a refrigeration priming for remote condensed applications in accordance with certain teachings of the present disclosure.
Figure 14B:
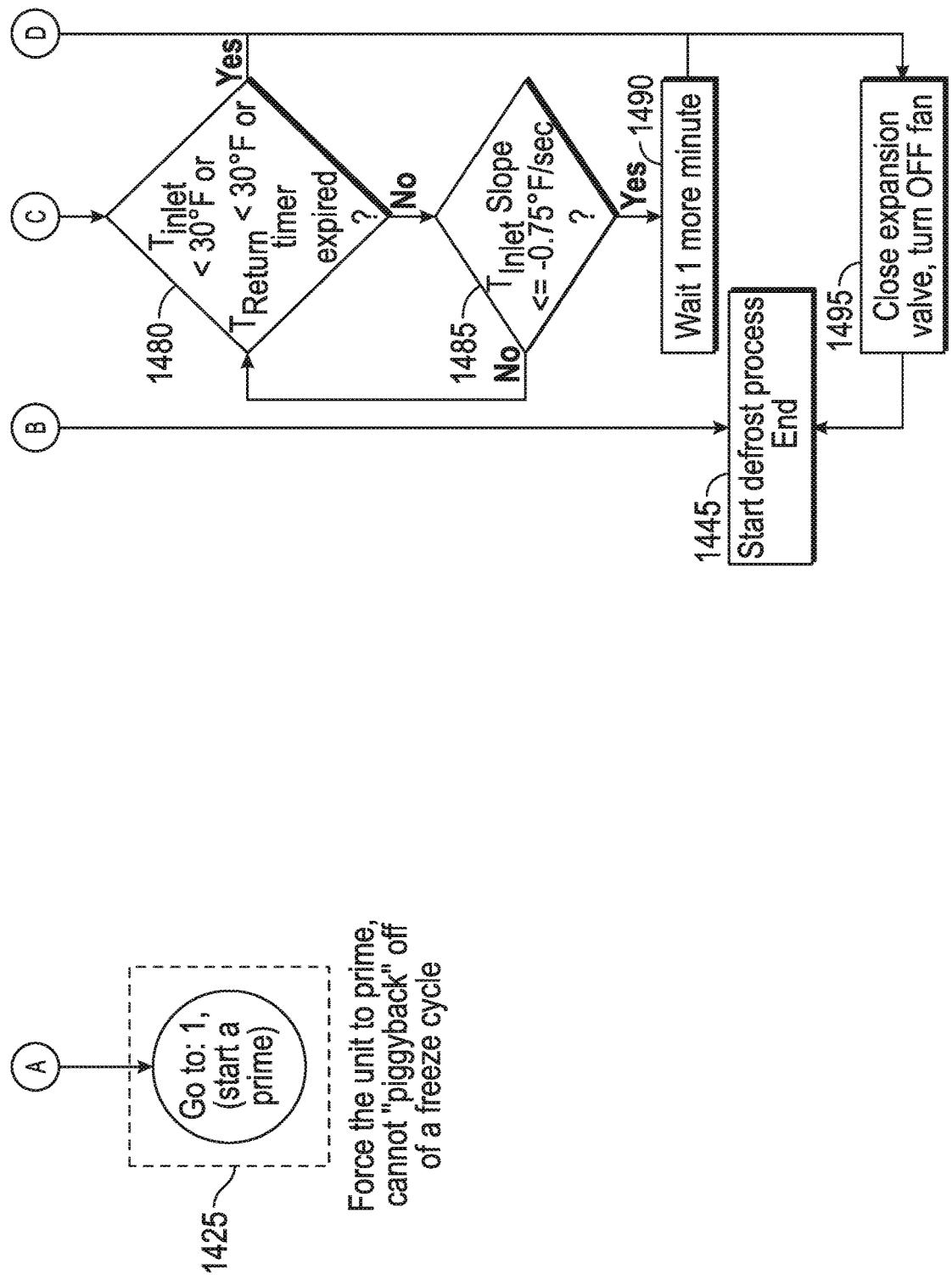

FIGS. 14A-B shows a flow chart illustrating a further exemplary method for controlling refrigeration priming for remote condensed applications in a frozen beverage machine in accordance with certain teachings of the present disclosure.

The left-hand side of the flowchart of FIGS. 14A-B illustrate scheduled defrosts. Typically, frozen beverage machines have a defrost schedule where each barrel is scheduled to defrost a particular number of times throughout the day. Typical machines defrost each barrel 3-6 times a day at set times. The logic on the left-hand side of the diagram starts to defrost a barrel if: the machine is within ±10 minutes of a scheduled defrost and one or more barrels has just finished freezing. This ensures that the refrigeration system is primed. If no barrels freeze during the 20-minute window, the logic forces a priming sequence to occur.

The right-hand side of the flowchart of FIGS. 14A-B illustrate a forced priming process and manually initiated defrosts (operator or service technician initiated defrosts). The frozen beverage machine does not know if the refrigeration system is primed; as a result, the system primes the refrigeration system by turning on the condenser fan (not shown) of the condenser fan 816, compressor 848, and expansion valve(s) 836*a-d* (shown in FIG. 13). The logic used to terminate the refrigerant prime uses a combination of evaporator inlet & return temperatures, beater % slope (beverage viscosity level—rate of change), temperature rate of change, and timer(s). A prime usually takes less than five minutes but could take longer in a less than ideal scenario. Instead of forcing every prime to last 5 minutes, the machine uses the logic in the flowchart to terminate when the machine determines that the refrigeration system is primed Turning to FIGS. 14A-B, the control system will first check at point 1405 to determine whether the current time is within a preset interval (in the example +/− 10 minutes) of a scheduled defrost time. This is because priming will only typically be an issue near the time of a desired defrost operation. If the decision step at 1405 determines that there is no imminent scheduled defrost operation, the system will take no action and loop back to step 1405.

If the system determines at step 1405 that a scheduled defrost is imminent, it will take steps to determine whether a priming operation is necessary. Initially, the system will determine whether two or more barrels are freezing at step 1410. If there are two or more barrels freezing, the system will presume that there is adequate refrigerant in the dispensing unit and then place the barrel or barrels scheduled to be defrosted into a defrost wait state at step 1435, wait for the freezing barrels to complete the freezing, and then initiate the defrost process at step 1445. Under this scenario, no priming is implemented.

If the system determines at step 1405 that two or more barrels are not freezing, it will then determine whether one barrel is freezing at step 1415. If the system determines that one barrel is freezing, it will determine whether the freezing barrel is the barrel to be defrosted at step 1430. If so, the system will wait for the freezing barrel to finish freezing at step 1440 and then initiate a defrost operation at step 1445. In such a scenario, no priming is necessary as the operation of freezing the barrel will ensure that adequate refrigerant is in the dispensing unit for an efficient defrost operation.

If the system determines at step 1430 that the freezing barrel is not the barrel to schedule to be defrosted, the system will put the barrel to be defrosted into a defrost wait state at step 1435, wait until the freezing barrel completes its freezing operation at step 1435 and then initiate a defrost operation at step 1445 when the freezing barrel has completed its freezing operation. Again under this scenario, no priming is necessary.

If the system determines at step 1415 that there are no freezing barrels it will recheck to ensure that the system is still within a given time (e.g., ten minutes) or a scheduled defrost operation. If it is not it will loop back to step 1410. If step 1415 determines that the system is within a given time of a scheduled defrost, it will then initiate and implement a priming operation because it is not able to use a freezing operation associated with one of the barrels to prime the system for the defrost operation.

Looking to the right-hand side of FIGS. 14A-B, the priming operation is illustrated for manual defrosts, such as those that may be implemented through activating of a user interface, such as a push button or touch screen selection.

Initially the system will determine at step 1450 whether the indicator for a manual defrost has been activated. If not, the system will continue to repeat step 1450. When a manual defrost is initiated, the system will not necessarily know whether the system is primed and will therefore initiate a forced priming operation, the duration of which will determine on the extent to which the system was primed when the forced priming operation was initiated.

Referring to FIGS. 14A-B, the forced prime operation will operate for a period defined by a time 1460, in the example one minute. The forced prime operation will begin at step 1455 by starting the time 1460, opening the expansion valve(s) associated with the barrels to be defrosted, and turning on the condenser fan. The system will then check to determine whether the time has expired at step 1465, if it has not, it will then look at a variety of indicators to determine whether the dispensing unit is adequately primed for a defrost operation at step 1475.

In the example of FIGS. 14A-B, the system looks at three independent criteria, any one of which can indicate that the dispensing unit is adequately primed. It will be understood that other criterial could be used and that not all of the specified criteria need to be used. For example, embodiments are envisioned where only one or two of the criterial set forth in the exemplary step 1475 are used.

Referring to step 1475, in the illustrated example, the system looks to see if the inlet temperature or the return temperature is below a desired value (e.g., 30 degrees F.) or if the percentage change in the beater slop is less than or equal to −1%/second. Existence of any of these conditions is indicative of adequate priming and, as such, if it is determined at step 1475 that any of these conditions are met, the system will close the open expansion valve(s), turn the condenser fan OFF and step 1495 and transition the system to the defrost operation at step 1445.

If step 1475 indicates that conditions associated with adequate priming are not detected, the system will then continue to run through the described loop until the 1-minute initial timer has expired.

If the system determines at step 1465 that the 1-minute initial timer has expired, the system will start a second time for a second period (e.g., four minutes) at step 1470 and them move to step 1480 where it will check for indicia for adequate priming. In the example of FIGS. 14A-B, the conditions used in step 1480 are two of those associated with step 1475 (e.g., inlet temperature or return temperature below 30 degrees F.) plus the expiration of the timer set in step 1470. If any of these conditions are met, the system will transition to step 1495 and operate as described above.

If step 1480 does not identify conditions associated with adequate priming, the system will transition to step 1485 where it looks at the rate of change of inlet temperature. If the rate of change of the inlet temperature is determined to meet a set criterial (in the example a rate of change associated with a slope of less than or equal to −0.75 degrees F. per second) then it is assumed that the system is almost primed, and the system will transition to step 1490 where the forced priming operation is completed for a defined duration (e.g., 1 minute) and then the system will transition to step 1495. If the described criterial is not met, the system will transition to step 1480 and continue to cycle through the described loop until the time set in step 1470 expires.

The following examples are included to demonstrate preferred embodiments of the additional or supplemental methods of refrigeration priming for remote condensed applications in a frozen beverage machine. It should be appreciated by those of skill in the art that the techniques disclosed in the examples that follow represent techniques discovered by the inventors to function well in the practice of the inventions, and thus can be considered to constitute preferred modes for its practice. However, those of skill in the art should, in light of the present disclosure, appreciate that many changes can be made in the specific embodiments which are disclosed and still obtain a like or similar result without departing from the scope of the inventions.

ALTERNATIVE OR SUPPLEMENTIVE EXAMPLES

Example 1

If the refrigeration machine is a remote condensing unit, the control system in the machine could prime the refrigeration system before attempting to defrost via a hot-gas bypass. The prime would occur for a fixed amount of time before every defrost cycle.

Example 2

The time elapsed since the last refrigeration freeze cycle could be used to determine if a refrigerant prime is needed. If a barrel had recently been frozen, then the system may already be effectively primed and not much refrigerant migration has occurred. Under this method, the controller would log the occurrence of freeze cycle and calculate the amount of time since the last freeze occurred. Before a defrost cycle is to occur, the controller would determine if a priming cycle is needed based on the amount of the time since the last freeze and or the last defrost.

Example 3

Defrosts could only be scheduled immediately after the machine has been on and freezing one of the barrels. If the refrigeration machine just finished a freeze cycle, then the system is already primed with refrigerant. The defrost process would then wait until after the machine turns on and completes a freeze cycle on one or more barrel evaporators.

Applicants have further created improved defrost effectiveness in remote condensers with refrigerant bleed assist and defrost priming cycle. A refrigerant bleed assist consist of allowing the refrigerant from the other non-defrosted beverage heat exchangers to become available for use in the defrost process. The refrigerant is in a liquid state ahead of the barrel heat exchangers' electronic metering device valves. The valves can be opened temporarily for a period of time (45-60 seconds) at the start of the defrost process to allow the stored up liquid refrigerant to pass on through the barrel heat exchanger(s) to the compressor suction line. The metering valves' then close while the defrost process continues.

The combination of the defrost priming methods and apparatuses described herein coupled with the refrigerant bleed assist may be used to further improve defrost effectiveness by increasing refrigerant mass for the defrost process. The added liquid refrigerant mass passes through the one or more barrel heat exchanger and becomes vapor as it moves toward the compressor suction line. The defrost process now has an increased volume of refrigerant for circulation. As the refrigerant vapor moves through the compressor, the heat of compression and internal motor heat is absorbed by the vapor raising its pressure and temperature. This increased temperature of the refrigerant when circulated into the barrel will lead to shorter defrost times.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of controlling a frozen beverage machine comprising:
    providing a frozen beverage machine comprising
        an expansion tank configured to receive a charge gas and a beverage solution and having a beverage solution inlet, a beverage solution outlet in fluid communication with a beverage solution freezing chamber, and an expansion tank gas inlet;
        a charge gas manifold comprising a charge gas manifold inlet, a charge gas manifold vent, and a charge gas supply outlet in fluid communication with the expansion tank gas inlet;
        a charge gas pressure transducer disposed between the manifold supply outlet and the expansion tank gas inlet and configured to generate an electrical signal representative of charge gas pressure in the expansion tank;
        a first controllable valve fluidly coupled with the charge gas manifold vent;
        a second controllable valve fluidly coupled with the charge gas manifold inlet;
        an electronic controller operatively coupled to the charge gas pressure transducer, the first controllable valve, and the second controllable valve, the controller configured to increase or decrease the charge gas pressure in the expansion tank;
    determining a value representative of charge gas pressure in the expansion tank;
    comparing the charge gas pressure value with a pressure value associated with a first drink profile;
    setting a charge gas vent timer of predetermined duration upon determining that the charge gas pressure value is greater than the first drink profile value;
    energizing the first controllable valve to decrease gas pressure in the expansion tank if the charge gas pressure value is greater than the first drink profile value;
    energizing the second controllable valve to increase gas pressure in the expansion tank if the charge gas pressure value is less than the first drink profile value;
    leaving the second controllable valve and the first controllable valve in unenergized states when the value representative of the charge gas pressure in the expansion tank is substantially equal to the first drink profile value; and
    maintaining the charge gas pressure value at about the first drink profile value by controllably energizing and de-energizing the first and second controllable valves.

2. The method of claim 1, further comprising reading the charge gas pressure value at predetermined intervals.

3. The method of claim 1, further comprising reading the charge gas pressure value a plurality of times during the duration of the vent timer.

4. The method of claim 1, further comprising terminating the vent timer when the charge gas pressure value is substantially equal to the first drink profile value.

5. The method of claim 1, further comprising setting a charge gas supply timer of predetermined duration upon determining that the charge gas pressure value is less than the first drink profile value.

6. The method of claim 5, further comprising reading the charge gas pressure value a plurality of times during the duration of the supply timer.

7. The method of claim 6, further comprising terminating the charge gas supply timer once the charge gas pressure value is substantially equal to the first drink profile value.

8. A method of controlling a frozen beverage machine, comprising:
    providing an expansion tank configured to receive a charge gas and a beverage solution, the expansion tank comprising a beverage solution inlet, a beverage solution outlet in fluid communication with a beverage solution freezing chamber; and a charge gas tank inlet;
    fluidly coupling a manifold outlet to the charge gas tank inlet;
    fluidly coupling a first controllable valve to the manifold, the first controllable valve configured to vent charge gas from the expansion tank through the manifold;
    fluidly coupling a second controllable valve to the manifold, the second valve configured to supply charge gas through the manifold to the expansion tank;
    generating an electronic signal representative of charge gas pressure in the expansion tank;
    comparing a value associated with the signal representative of the charge gas pressure in the expansion tank with a value associated with a first drink profile;

setting a timer of predetermined duration when the comparison of the value associated with the signal representative of the charge gas pressure in the expansion tank is unequal to the value associated with a first drink profile;

energizing the first valve to decrease gas pressure in the expansion tank if the charge gas pressure value is greater than the first drink profile value;

energizing the second valve to increase gas pressure in the expansion tank if the charge gas pressure value is less than the first drink profile value; and maintaining the charge gas pressure value at about the first drink profile value by controllably energizing and de-energizing the first and second controllable valves.

9. The method of claim 8, reading the charge gas pressure in the expansion tank a plurality of times during the timer duration.

10. The method of claim 8, further comprising determining the charge gas pressure value at predetermined intervals.

11. The method of claim 8, further comprising terminating the timer once the charge gas pressure value is substantially equal to the first drink profile value.

12. The method of claim 8, further comprising setting a charge gas supply timer of predetermined duration upon determining that the charge gas pressure value is less than the first drink profile value.

13. The method of claim 12, further comprising determining the charge gas pressure value a plurality of times during the duration of the charge gas supply timer.

14. The method of claim 13, further comprising terminating the charge gas supply timer once the charge gas pressure value is substantially equal to the first drink profile value.

* * * * *